United States Patent
Kawashima

(10) Patent No.: US 7,322,654 B2
(45) Date of Patent: Jan. 29, 2008

(54) BRACKET ANGLE ADJUSTMENT MECHANISM

(75) Inventor: Yoshihito Kawashima, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 33 days.

(21) Appl. No.: 11/317,799

(22) Filed: Dec. 22, 2005

(65) Prior Publication Data

US 2006/0158012 A1    Jul. 20, 2006

(30) Foreign Application Priority Data

Dec. 28, 2004 (JP) ............................. 2004-379690
Oct. 13, 2005 (JP) ............................. 2005-298506

(51) Int. Cl.
*B60N 2/02* (2006.01)

(52) U.S. Cl. .................................... 297/362
(58) Field of Classification Search ............... 297/362; 475/178, 180, 162
See application file for complete search history.

(56) References Cited

U.S. PATENT DOCUMENTS

| | | | | |
|---|---|---|---|---|
| 4,149,431 A | * | 4/1979 | Rouverol | ..................... 74/462 |
| 4,302,047 A | * | 11/1981 | Esser | ......................... 297/362 |
| 5,096,261 A | * | 3/1992 | Baloche | ....................... 297/362 |
| 5,188,571 A | * | 2/1993 | Boltze et al. | ................ 475/162 |
| 5,716,159 A | * | 2/1998 | Tomikawa | ................ 403/359.6 |
| 5,871,414 A | | 2/1999 | Voss et al. | |
| 7,086,699 B1 | * | 8/2006 | Addison et al. | ............ 297/374 |
| 7,090,298 B2 | * | 8/2006 | Lange | ......................... 297/362 |
| 2005/0110322 A1 | * | 5/2005 | Cha | ............................ 297/362 |
| 2005/0231017 A1 | | 10/2005 | Lange | |

FOREIGN PATENT DOCUMENTS

| | | |
|---|---|---|
| JP | 63-47443 | 12/1994 |
| JP | 7-79740 | 8/1995 |
| WO | WO 03/043847 A1 | 5/2003 |

* cited by examiner

*Primary Examiner*—Sarah B McPartlin
(74) *Attorney, Agent, or Firm*—Gerald E. Hespos; Anthony J. Casella

(57) ABSTRACT

Disclosed is a bracket angle adjustment mechanism which includes external-tooth and internal-tooth gears having improved tooth shapes allowing an operating force for rotating a control shaft to be reduced. In the bracket angle adjustment mechanism, each of external teeth (14b) of the external-tooth gear 14 has a half-round shape having a center defined by a single point "a" on a reference circle PC (14), in a region of an addendum T1 between the reference circle PC (14) and a tip circle AC (14), and an undercut shape in a region of a dedendum T2 between the reference circle PC (14) and a root circle DC. Further, each of internal teeth (15b) of the internal-tooth gear (15) has an arc shape free of interference with the half-round-shaped addendum region.

10 Claims, 18 Drawing Sheets

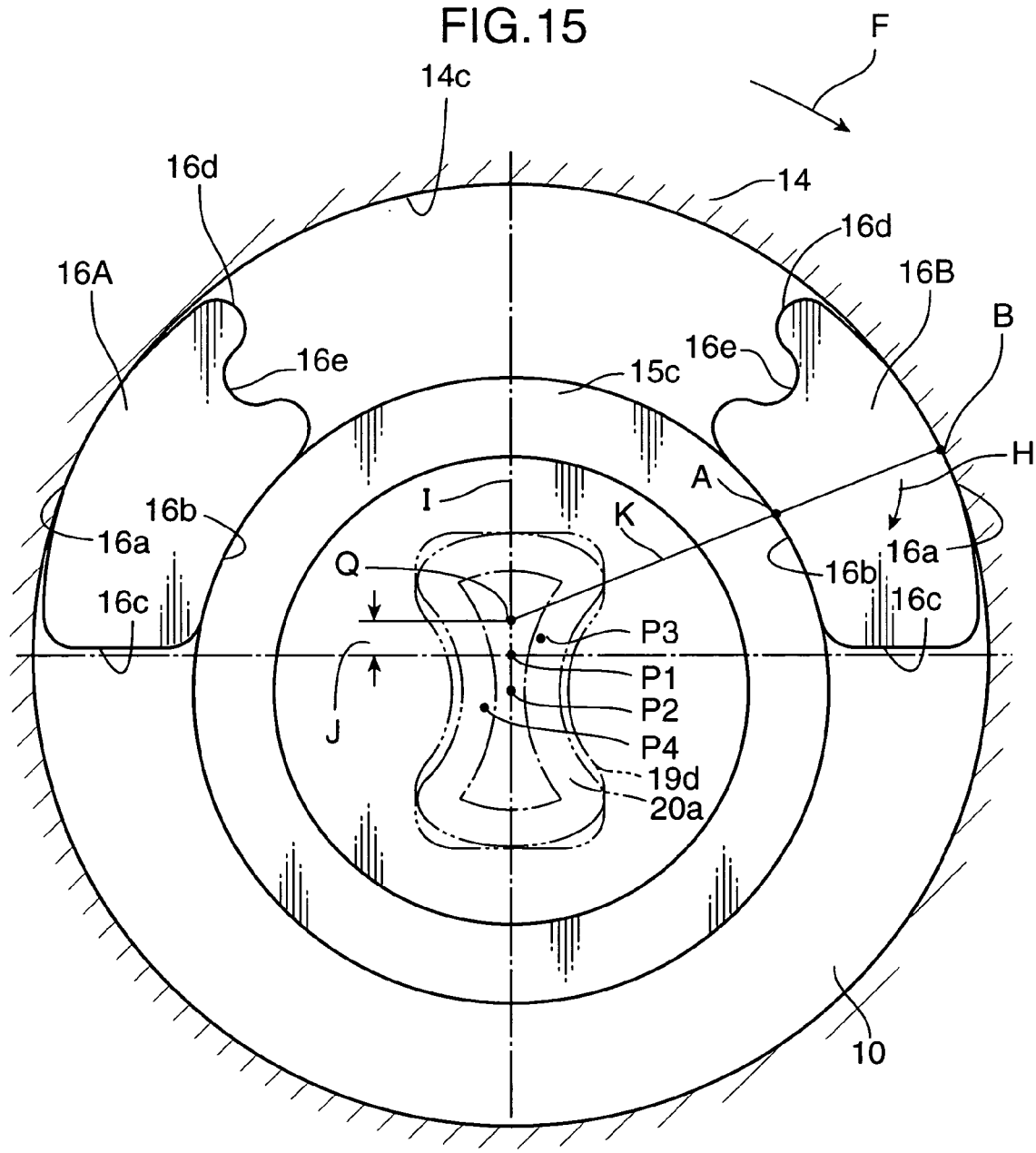

BRACKET ANGLE ADJUSTMENT MECHANISM

BACKGROUND OF THE INVENTION

1. Field of the Invention

The present invention relates to a bracket angle adjustment mechanism.

2. Description of the Related Art

Heretofore, there has been known one type of bracket angle adjustment mechanism. For example, in a vehicle seat assembly 1 as shown in FIG. 18, the bracket angle adjustment mechanism comprises a first bracket 4 fixed to a seat cushion 2, and a second bracket 5 fixed to a seat back 3, wherein a handle 7 fixed to a control shaft 6 is manually rotated clockwise or counterclockwise to adjust an angle of the second bracket 5 relative to the first bracket 4, i.e. a frontward/rearward reclining angle of the seat back 3 (see, for example, Japanese Patent Publication No. 63-47443: Patent Publication 1).

More specifically, the first bracket 4 includes an external-tooth gear 4a, and the second bracket 5 includes an internal-tooth gear 5a which has a larger number of teeth than that of the external-tooth gear 4a. The control shaft 6 has an inward end supported by a central hole 5b of the second bracket 5.

The bracket angle adjustment mechanism further includes a pair of wedge members 11A, 11B and a spring member 12. The pair of wedge members 11A, 11B are fitted in an eccentric space 10 which is defined between an inner peripheral surface of a large-diameter hole 4a formed in a central region of the external-tooth gear 4a and an outer peripheral surface of a small-diameter shank 9a integral with or constituting a central portion of the internal-tooth gear 5a (in this conventional example, the small-diameter shank 9a corresponds to a given circumferential portion 9a of a follower disk 9 fixed to the control shaft 6), when respective portions of the external-tooth gear 4a and the internal-tooth gear 5a are engaged with one another. The spring member 12 is interposed between the pair of wedge members 11A, 11B in the eccentric space to apply a biasing force to each of the wedge members 11A, 11B in a wedging direction, i.e. in a direction allowing each of the wedge members 11A, 11B to be wedged between the inner peripheral surface of the large-diameter central hole 4a and the outer peripheral surface of the small-diameter central shank 9a. The control shaft 6 is adapted to move a wedged-state releasing portion (which corresponds to a follower protrusion 9b formed in the follower disk 9) located between respective wedging ends of the wedge members 11A, 11B. In FIG. 18C, the reference numeral 13 indicates a cover plate fixed to the second bracket 5. The cover plate 13 extends to cover the external-tooth gear 4a of the first bracket 4, and has a bearing portion 13a supporting an outward portion of the control shaft 13a.

In an operation for adjusting an angle of the second bracket 5 relative to the first bracket 4, i.e. a frontward/rearward reclining angle of the seat back 3, the handle 7 is manually rotated to rotate the control shaft 6. In conjunction with the rotation of the control shaft 6, the wedged-state releasing portion 9b is rotated to move the pair of wedge members 11A, 11B together with the spring member 12 circularly in the eccentric space 10, so that the small-diameter shank 9a is eccentrically moved relative to the large-diameter hole 4b to allow an engagement position of the internal-tooth gear 5a relative to the external-tooth gear 4a to be changed.

In connection with this type of bracket angle adjustment mechanism, there has also been known a technique intended to provide enhanced stability and operability under load by determining respective diameters of a reference circle and an addendum or tip circle of the external-tooth gear 4a or the internal-tooth gear 4b having an involute tooth profile, or by forming a an arc-shaped portion in a tooth tip thereof (see Japanese Patent Publication No. 07-79740: Patent Publication 2).

In the bracket angle adjustment mechanism as disclosed in the Patent Publication 1, there remain much needs to be improved. As one of the problems, when the external teeth of the external-tooth gear 4a with an involute tooth profile are rotated relative to the internal teeth 5a of the internal-tooth gear with an involute tooth profile, a component force is generated in a direction causing release of the engagement therebetween, and an operating force necessary for rotating the control shaft 6 is increased due to the component force.

SUMMARY OF THE INVENTION

In view of the above problem, it is an object of the present invention to provide a bracket angle adjustment mechanism which can reduce an operating force of a control shaft based on an improved tooth profile in external-tooth and internal-tooth gears.

According to an aspect of the invention, a bracket angle adjustment mechanism is provided with one bracket including an external-tooth gear, another bracket including an internal-tooth gear which has a larger number of internal teeth than that of external teeth of the external-tooth gear; a pair of wedge members fitted in an eccentric space which is defined between a large-diameter hole formed in a central region of the external-tooth gear and a small-diameter shank constituting a central portion of the internal-tooth gear, in a state when the external-tooth gear and the internal-tooth gear are partly engaged with one another; a spring member applying a biasing force to each of the pair of wedge members in a wedging direction; and a wedged-state release member disposed between respective wedging-directional leading edges of the pair of wedge members. The wedged-state release member is operable, when rotated by a control shaft associated therewith, to move the pair of wedge members together with the spring member in a wedged-state release direction around the eccentric space, whereby the small-diameter shank is eccentrically moved relative to the large-diameter hole to allow an engagement position of the internal-tooth gear relative to the external-tooth gear to be changed so as to adjust an angle of the second bracket relative to the first bracket. Each of the external teeth of the external-tooth gear has in at least one portion an arc shape allowing a force for rotating the control shaft to be reduced, and each of the internal teeth of the internal-tooth gear has a shape free of interference with a region of an addendum in a corresponding one of the external teeth.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 4 illustrates a gear unit of the bracket angle adjustment mechanism in FIG. 1, wherein

FIG. 5 illustrates the gear unit in FIG. 4, wherein

FIG. 6 illustrates the gear unit in FIG. 5, wherein

FIG. 9 illustrates a wedged-state release member of the bracket angle adjustment mechanism in FIG. 1, wherein

FIG. 10 illustrates a part of teeth in the bracket angle adjustment mechanism in FIG. 1, wherein

FIG. 11 illustrates a state of tooth engagement, wherein FIG. 1A is an enlarged view showing an engagement state of the internal and external teeth in the bracket angle adjustment mechanism in FIG. 1.

FIG. 12 illustrates internal-tooth and external-tooth gears in the bracket angle adjustment mechanism in FIG. 1, wherein

FIG. 15 is a front view showing the wedge member, in the state when a load acts on the seat back.

FIG. 16 illustrates one modification of a wedge member, wherein

FIG. 17 illustrates the wedge member in FIG. 16 and a wedged-state release member, wherein

FIG. 18 illustrates a conventional bracket angle adjustment mechanism, wherein

DETAILED DESCRIPTION OF THE PREFERRED EMBODIMENTS

Figure 18A:
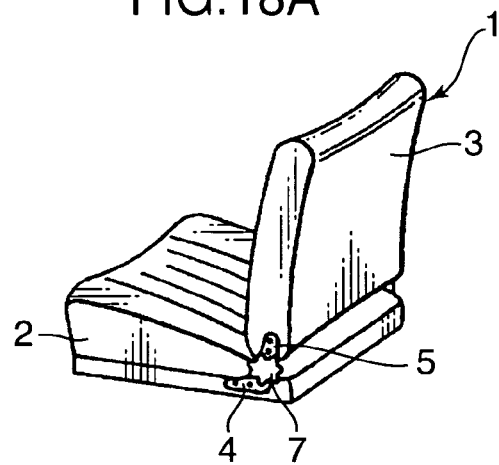
FIG. 18A is a perspective view showing a vehicle sheet assembly equipped therewith.
Figure 18B:
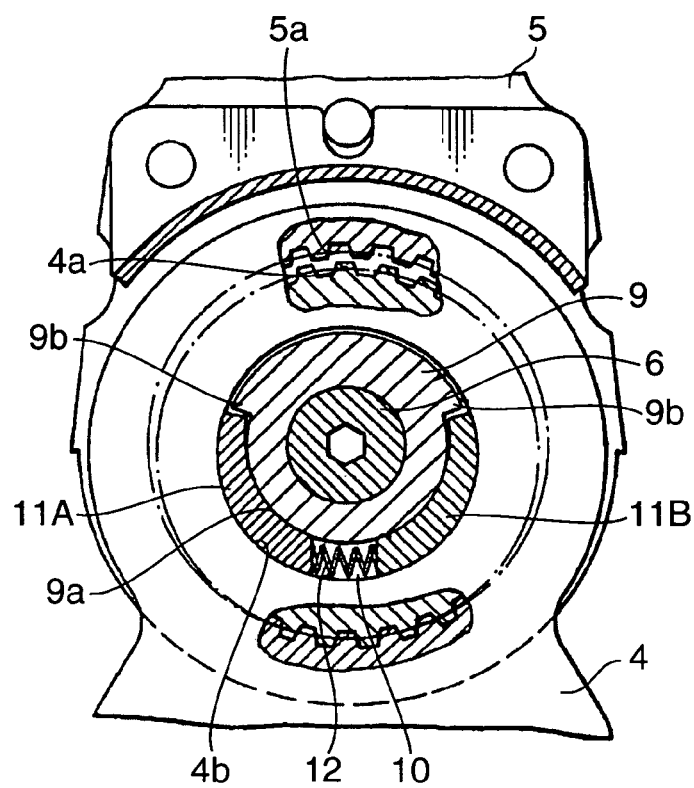
FIGS. 18B and 18C are, respectively, a partially sectional front view and a sectional side view showing the conventional bracket angle adjustment mechanism.
Figure 18C:
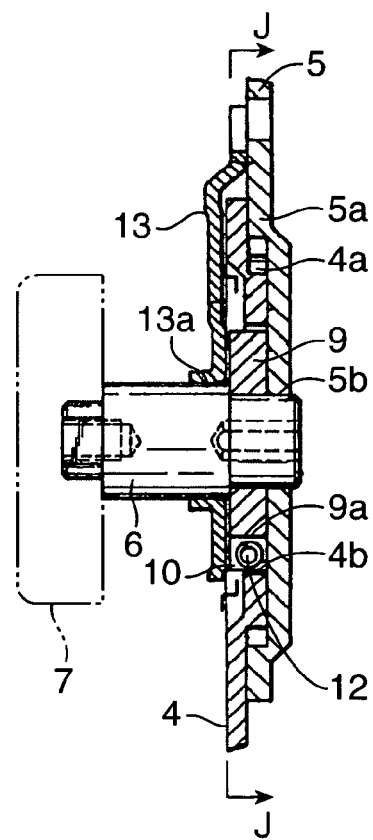

With reference to the drawings, a best mode for carrying out the present invention will now be described. In the related figures, structurally/functionally the same element or component as that of the conventional example in FIG. 18 is defined by the same reference numeral, and its detailed description will be omitted.

A bracket angle adjustment mechanism according to one embodiment of the present invention is incorporated in a vehicle seat assembly 1 having a seat cushion 2 and a seat back 3. As shown in FIGS. 1 to 3 and FIG. 8, the bracket angle adjustment mechanism comprises a first bracket 4 which is fixed to the seat cushion 2 using a bolt (not shown) penetrating through each of two bolt holes 4d formed in the first bracket 4, and a second bracket 5 which is fixed to the seat back 3 using a bolt (not shown) penetrating through each of two bolt holes 4d formed in the second bracket 5. The bracket angle adjustment mechanism is designed to adjust an angle of the second bracket 5 relative to the first bracket 4, i.e. a frontward/rearward inclining angle of the seat back 3 relative to the seat cushion 2, according to rotation of a control shaft 20 in conjunction with a clockwise/counterclockwise rotation of a handle 7 fixed thereto. In this embodiment, the first and second brackets 4, 5 and after-mentioned associated components, such as a gear unit U, are fixed to either one of opposite lateral sides of the seat assembly 1.

The bracket angle adjustment mechanism includes an external-tooth gear 14 and an internal-tooth gear 15. The external-tooth gear 14 is integrally formed in a first disk-shaped plate member by partly pressing an outer surface of the first plate member inward in such a manner as to allow an inner surface thereof to have a convex portion with a plurality of external teeth. The internal-tooth gear 15 is integrally formed in a second disk-shaped plate member by partly pressing an inner surface of the second plate member outward in such a manner as to allow an outer surface thereof to have a concave portion with a plurality of internal teeth. The external-tooth gear 14 and the internal-tooth gear 15 are assembled together as an after-mentioned gear unit U. Then, the external-tooth gear 14 is fixed to the first bracket 4, for example, by welding after a plurality (eight in this embodiment) of protrusions formed in the outside surface of the external-tooth gear 14 is fitted into a plurality of corresponding positioning holes formed in the first bracket 4. Further, the internal-tooth gear 15 is fixed to the second bracket 5, for example, by welding after a plurality (eight in this embodiment) of protrusions formed in the outside surface of the internal-tooth gear 15 is fitted into a plurality of corresponding positioning holes formed in the second bracket 5. Alternatively, as with the conventional bracket angle adjustment mechanism, the external-tooth gear 14 may be integrally formed in the first bracket 4 by partly pressing an outer surface of the first bracket 4 inward in such a manner as to allow an inner surface thereof to have a convex portion with a plurality of external teeth, and the internal-tooth gear 15 may integrally formed in the second bracket 5 by partly pressing an inner surface of the second bracket 5 outward in such a manner as to allow an outer surface thereof to have a concave portion with a plurality of internal teeth.

The internal teeth 15b of the internal-tooth gear 15 are formed in a number (fifty in this embodiment) greater than that (forty nine in this embodiment) of the external teeth 14b of the external-tooth gear 14. Each shape of the external teeth 14b of the external-tooth gear 14 and the internal teeth 15b of the internal-tooth gear 15 will be described in detail later with reference to FIGS. 10 and 11.

The external-tooth gear 14 has a central region formed as a large-diameter hole 14c, and the internal-tooth gear 15 has a central region formed as a hollow small-diameter shank 15c protruding into the large-diameter hole 14c of the external-tooth gear 14. The first bracket 4 is formed with a hole 4e corresponding to the large-diameter hole 14c of the external-tooth gear 14, and the second bracket 5 is formed with a hole 5e corresponding to the small-diameter shank 15c of the internal-tooth gear 15.

Figure 5A:
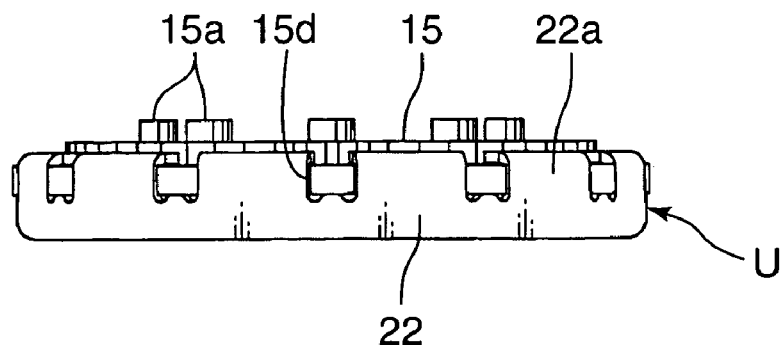
FIG. 5A is a top plan view.
Figure 5B:
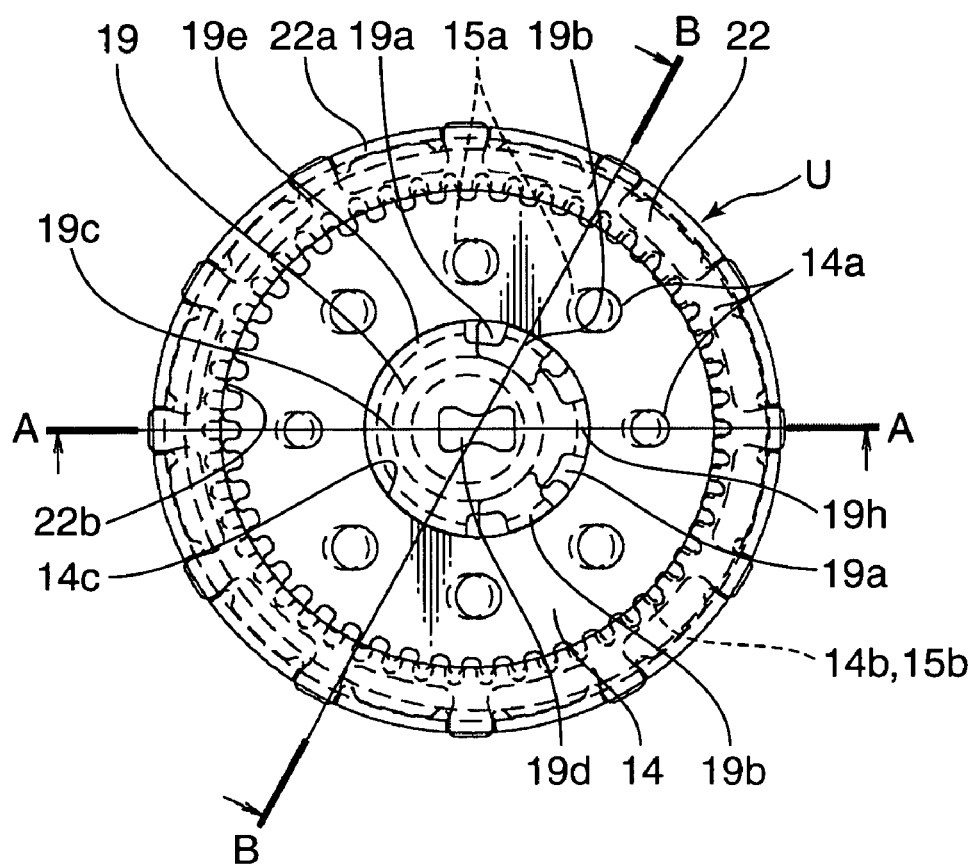
FIG. 5B is a front plan view.
Figure 6A:
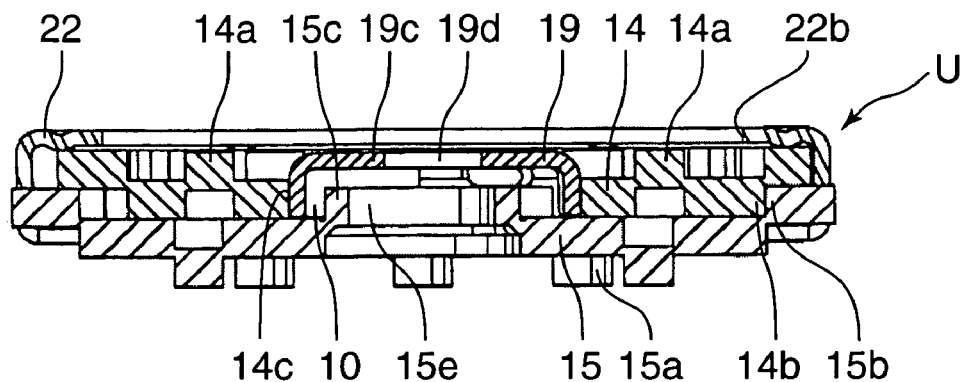
FIG. 6A is a sectional view taken along the line A-A in FIG. 5B.
Figure 6B:
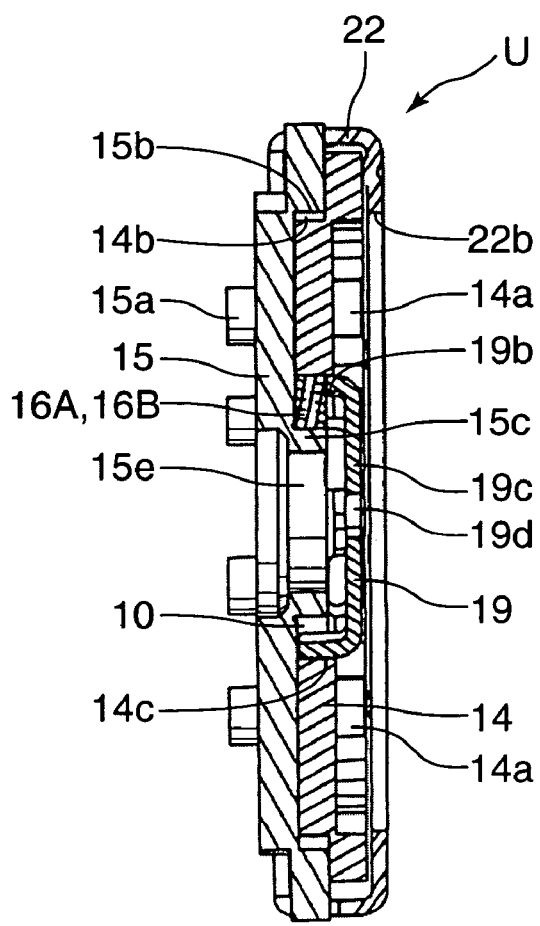
FIG. 6B is a sectional view taken along the line B-B in FIG. 5B.

The bracket angle adjustment mechanism includes a ring-shaped retainer member 22 fitted on an outer peripheral surface of the first plate member having the external-tooth gear 14. The ring-shaped retainer member 22 has an outer peripheral portion formed as a plurality (twelve in this embodiment) of pawls 22a. In the assembling process of the gear unit U, these pawls 22a are engaged with a plurality of corresponding cutout portions formed in an outer peripheral surface of the second plate member having the internal-tooth gear 15, and then folded downward in a crimping manner, so that the external-tooth gear 14 and the internal-tooth gear 15 are assembled together as the gear unit U where the external teeth 14b of the external-tooth gear 14 and the internal teeth 15b of the internal-tooth gear 15 are partly engaged with each other while allowing a relative movement between the external-tooth gear 14 and the internal-tooth gear 15, as shown in FIGS. 5 and 6. While the ring-shaped retainer member 22 in this embodiment is designed to crimpingly hold the external-tooth gear 14 from the side of the internal-tooth gear 15, it may be designed to crimpingly hold the internal-tooth gear 15 from the side of the external-tooth gear 14. Further, in place of the ring-shaped retainer member 22, the external-tooth gear 14 and the internal-tooth gear 15 may be fastened together using a presser member fixed to either one of the first and second brackets 4, 5 by welding or riveting.

Figure 1:
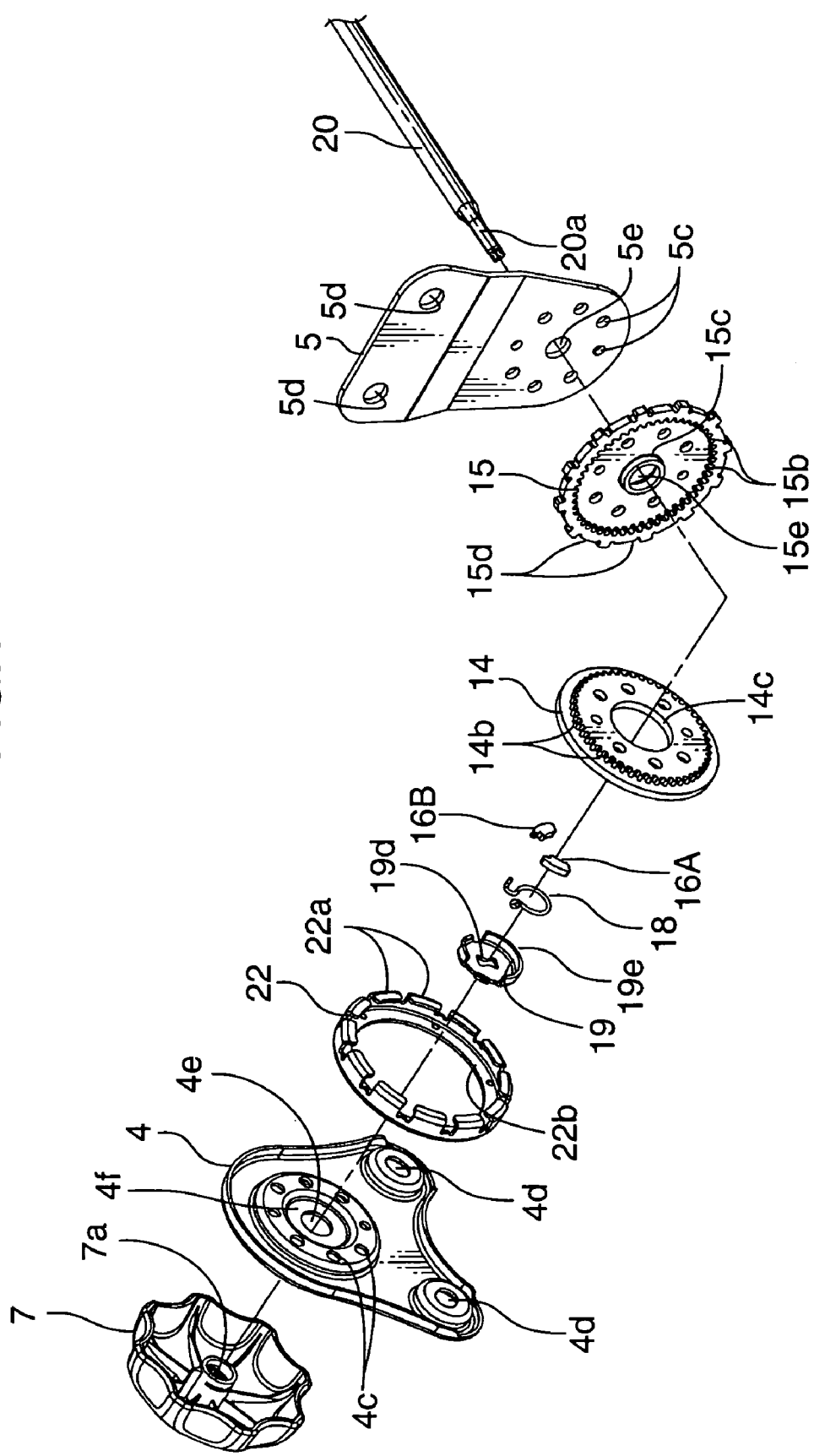
FIG. 1 is an exploded perspective view showing a bracket angle adjustment mechanism according to one embodiment of the present invention, wherein the mechanism is applied to a vehicle seat assembly.
Figure 2:
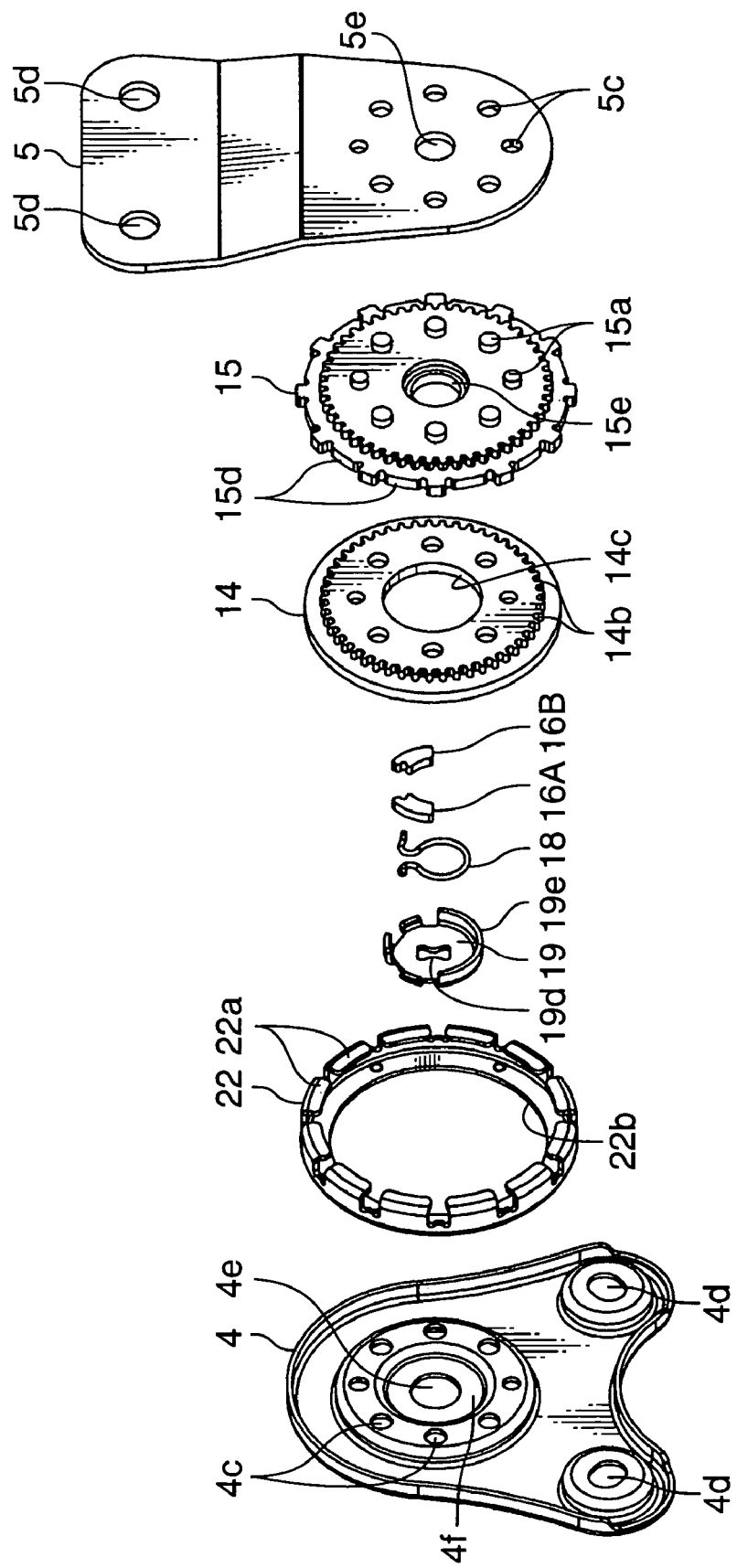
FIG. 2 is an exploded perspective view showing the bracket angle adjustment mechanism in FIG. 1, when viewed from the side of an outer surface of a second bracket thereof.
Figure 3:
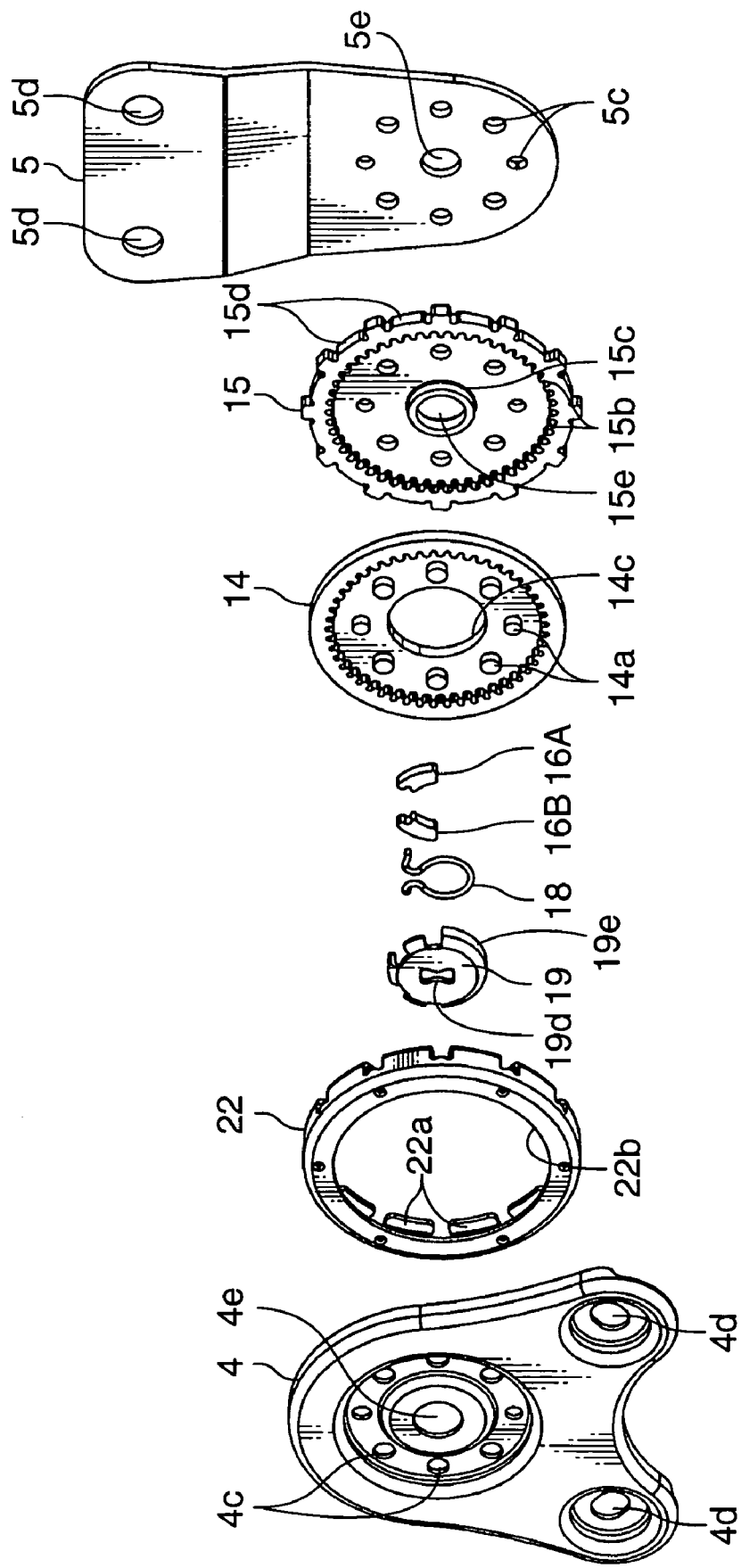
FIG. 3 is an exploded perspective view showing the bracket angle adjustment mechanism in FIG. 1, when viewed from the side of an outer surface of a first bracket thereof.
Figure 4A:
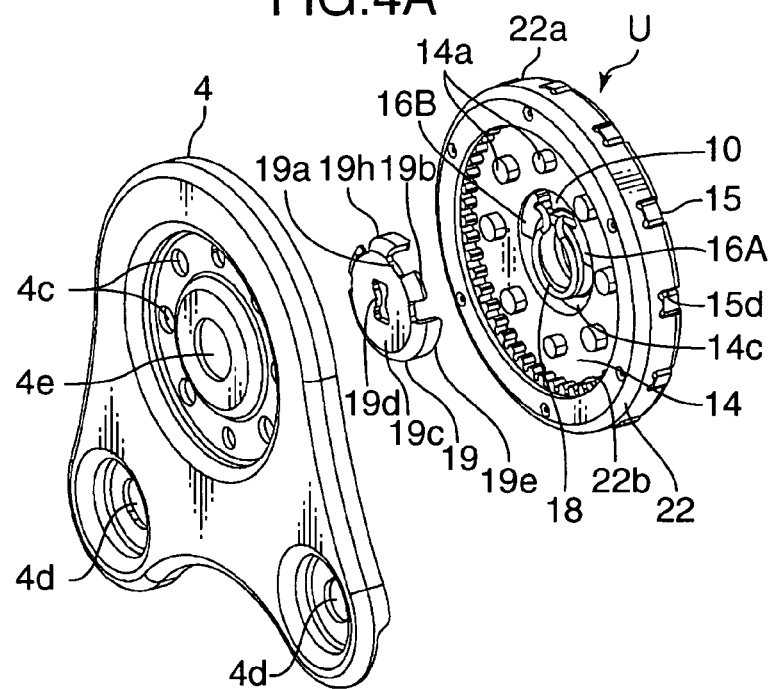
FIG. 4A is a perspective view showing the gear unit together with the first bracket.
Figure 4B:
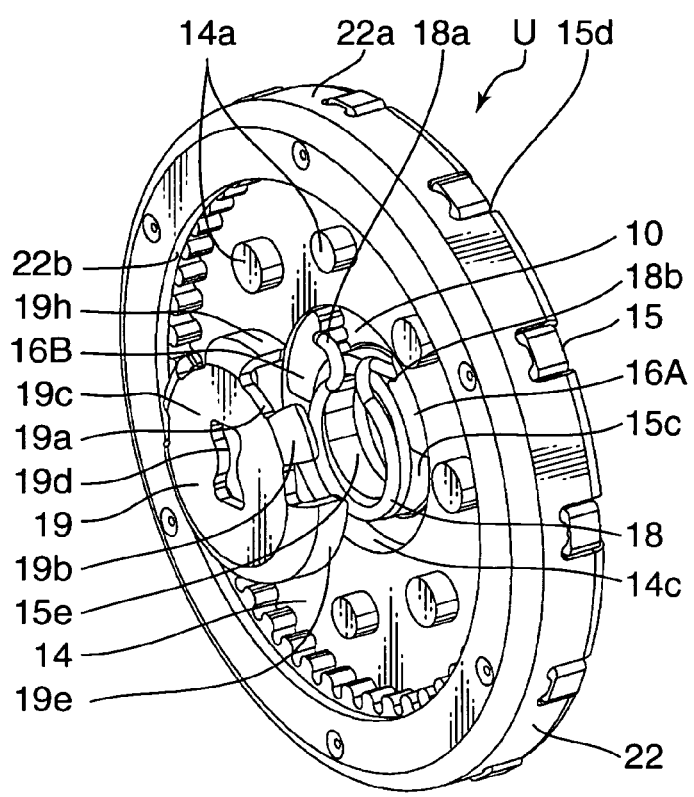
FIG. 4B is an enlarged perspective view showing the gear unit.
Figure 8:
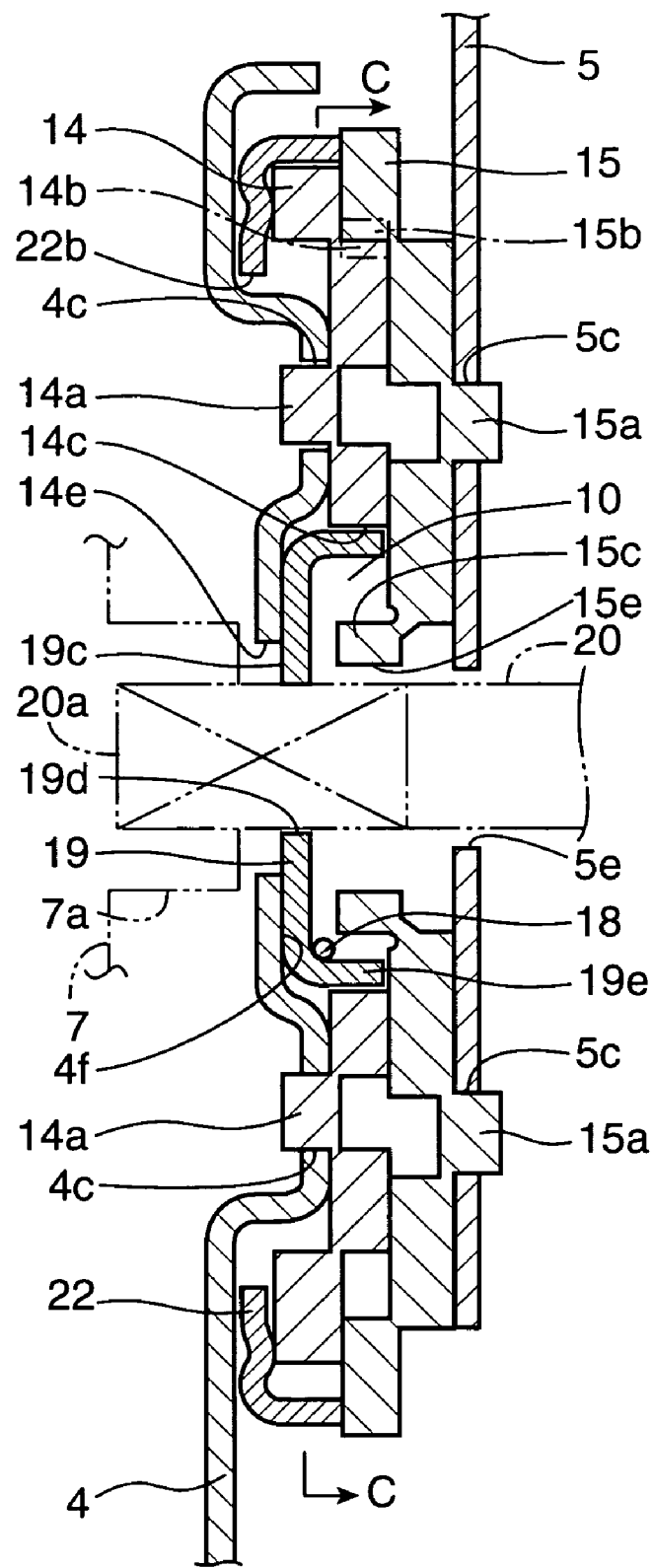
FIG. 8 is a vertical sectional view showing the bracket angle adjustment mechanism in FIG. 1.

The bracket angle adjustment mechanism further includes a pair of wedge members 16A, 16B, a spring member 18 and a wedged-state release member 19. As shown in FIG. 4, after the external-tooth gear 14 and the internal-tooth gear 15 are assembled together as the gear unit U using the ring-shaped retainer member 22, these components are incorporated into an after-mentioned eccentric space 10 etc., from a large-diameter opening 22b of the ring-shaped retainer member 22. Specifically, the spring member 18 has an outer shape or outer dimensions allowing for being housed in an inner space of the wedged-state release member 19. As shown in FIG. 8, when the external-tooth gear 14 is fixed to the first bracket 4, for example, by welding after fitting the protrusions 14a of the external-tooth gear 14 into the positioning holes 4c of the first bracket 4, the wedged-state release member 19 is pressed by a concave portion 4a surrounding the hole 4e of the first bracket 4, and thereby kept from dropping out of the large-diameter hole 14c.

Figure 7:
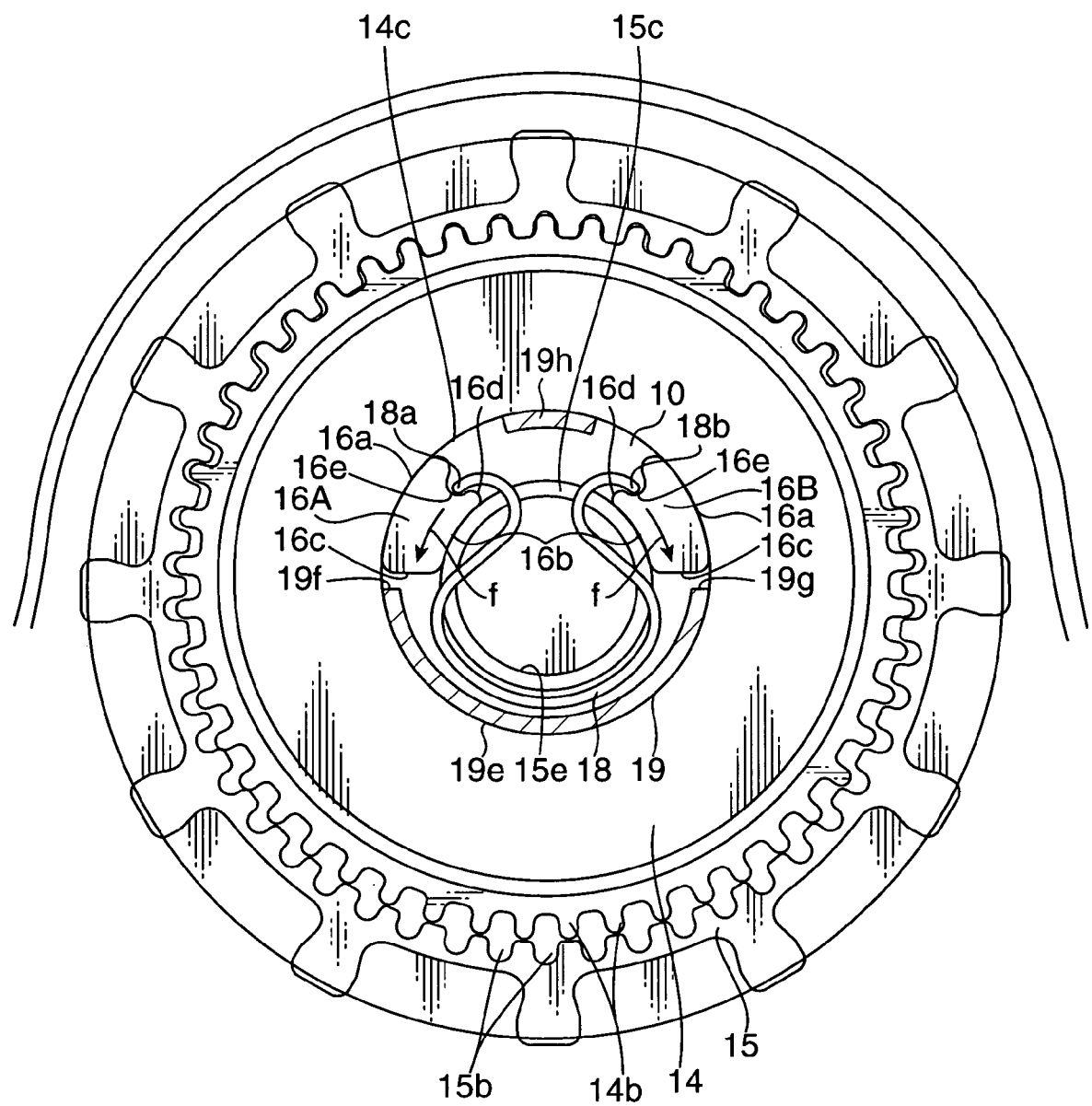
FIG. 7 is a sectional view taken along the line C-C in FIG. 8.

As specifically shown in FIGS. 7 and 8, when the external teeth 14b of the external-tooth gear 14 and the internal teeth 15b of the internal-tooth gear 15 are partly engaged with each other, an eccentric space 10 is defined between an inner peripheral surface of the large-diameter hole 14c of the external-tooth gear 14 and an outer peripheral surface of the small-diameter shank 15c of the internal-tooth gear 15. The pair of wedge members 16A, 16B is fitted into this eccentric space 10.

The large-diameter hole 14c of the external-tooth gear 14 is formed to have a hole length equal to a thickness of the first plate member, and each of the wedge members 16A, 16B is also formed to have a thickness equal to the thickness of the first plate member.

In one of conventional bracket angle adjustment mechanisms, a ring-shaped member having a length greater than the thickness of the first plate member is additionally fitted in the inner surface of the large-diameter hole 14c so as to allow the large-diameter hole 14c of the external-tooth gear 14 to have a hole length greater than the thickness of the first plate member, and each of the wedge members 16A, 16B is formed to have a thickness greater than the thickness of the first plate member. While this technique is intended to increase the thickness of each of the wedge members 16A, 16B so as to provide an increased contact surface with the inner peripheral surface of the large-diameter hole 14c and the outer peripheral surface of the small-diameter shank 15c, the ring-shaped member will undesirably protrude beyond the thickness of the first plate member to cause increase in the entire thickness of the bracket angle adjustment mechanism.

In contrast, the above structure in this embodiment, where the large-diameter hole 14c of the external-tooth gear 14 is formed to have a hole length equal to a thickness of the first plate member, and each of the wedge members 16A, 16B is also formed to have a thickness equal to the thickness of the first plate member, makes it possible to omit the ring-shaped member protruding beyond the thickness of the first plate member, so as to reduce the entire thickness of the bracket angle adjustment mechanism. Further, as measures for increasing a contact surface of each of the wedge members 16A, 16B relative to the inner peripheral surface of the large-diameter hole 14c and the outer peripheral surface of the small-diameter shank 15c, each of the wedge members 16A, 16B may be formed to increase each circumferential length of an arc-shaped outer surface 16a and an arc-shaped inner surface 16a, as described in detail with reference to FIG. 15.

Each of the wedge members 16A, 16B is formed to have an arc-shaped outer surface 16a approximately along the arc-shaped inner peripheral surface of the large-diameter hole 14c of the external-tooth gear 14, and an arc-shaped inner surface 16b approximately along the arc-shaped outer peripheral surface of the small-diameter shank 15c of the internal-tooth gear 15. Each of the wedge members 16A, 16B is also formed in a wedge shape which is gradually increased in width in a direction from a leading edge to a trailing edge thereof. The respective shapes of the arc-shaped outer surface 16a and the arc-shaped inner surface 16b of each of the wedge members 16A, 16B will be described in detail later with reference to FIGS. 14 and 15.

The spring member 18 is formed in an approximately Ω shape having outer dimensions less than that of the inner peripheral surface 14c of the external-tooth gear 14. As shown in FIG. 7, the spring member 18 has one end 18a engaged with a concave portion 16e formed in the trailing edge 16d of one 16A of the wedge members, and the other end 18b engaged with a concave portion 16e formed in the trailing edge 16d of the other wedge member 16B. Thus, the spring member 18 is operable to apply a biasing force to each of the wedge members 16A, 16B in a wedging direction f allowing each of the wedge members 16A, 16B to be wedged between the inner peripheral surface of the large-diameter hole 14c of the external-tooth gear 14 and the outer peripheral surface of the small-diameter shank 15c of the internal-tooth gear 15 in the eccentric space 10.

Figure 9A:
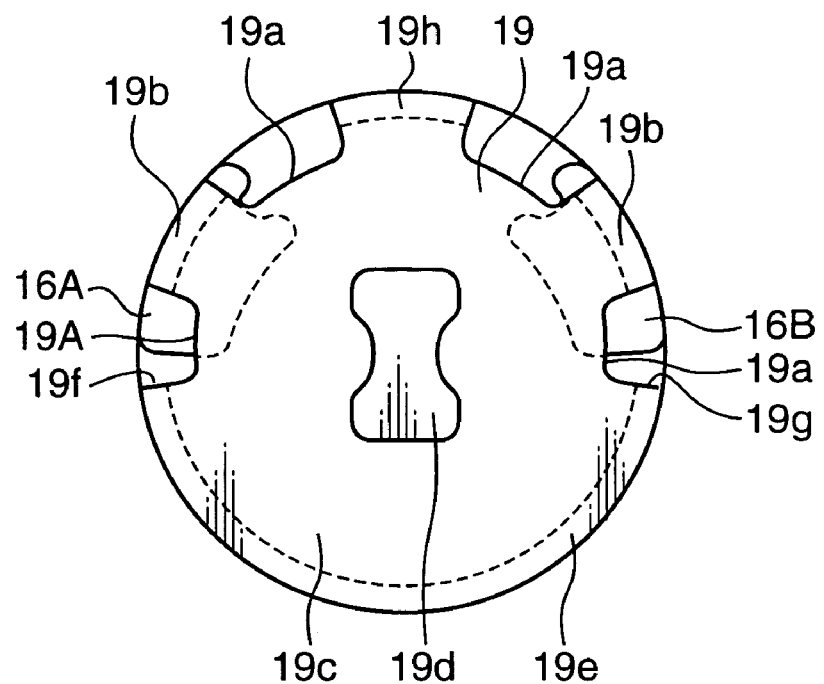
FIG. 9A is a front view.
Figure 9B:
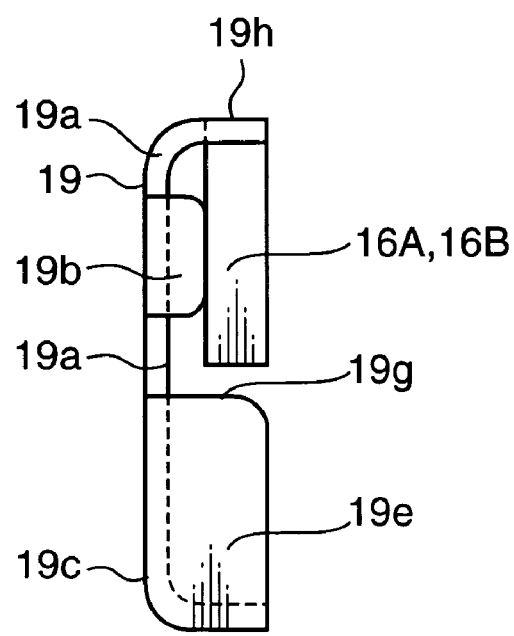
FIG. 9B is a side view.

The wedged-state release member 19 is formed in a bottomed cylindrical shape, and rotatably fitted in the inner peripheral surface of the large-diameter hole 14c of the external-tooth gear 14. As specifically shown in FIG. 9, the wedged-state release member 19 is formed with a plurality of clearance grooves 19a, a pair of pressing portions 19b, and a noncircular hole 19d in a bottom 19c thereof. In the state after the wedged-state release member 19 is fitted in the large-diameter hole 14c, the clearance grooves 19a serve as a means to avoid excessive interference between the wedged-state release member 19 and the wedge members 16A, 16B, and each of the pressing portions 19b serves as a means to press a corresponding one of the wedge members 16A, 16B so as to prevent it from rising toward the wedged-state release member 19. Further, the noncircular hole 19d is engaged with a noncircular portion 20a of an after-mentioned control shaft 20 in a non-rotatable manner relative to the wedged-state release member 19.

The wedged-state release member 19 is further formed with an half-round arc-shaped wedged-state release portion 19e is located between the respective wedging or leading edges 19c of the wedge members 16A, 16B. For example, in FIG. 7, when the wedged-state release member 19 is rotated clockwise, one 19a of opposite edges of the wedged-state release portion 19e is brought into contact with the leading edge 16c of the wedge member 16A. When the wedged-state release member 19 is rotated counterclockwise, the other edge 19g of the wedged-state release portion 19e is brought into contact with the leading edge 16c of the wedge member 16B. The wedged-state release member 19 is rotatably fitted in the inner peripheral surface 14c of the external-tooth gear 14 through the wedged-state release portion 19e and an arc-shaped portion 19h formed in the wedged-state release member 19 at a position opposed to the wedged-state release portion 19e.

With Reference to FIG. 8, after inserted from the hole 5e of the second bracket 5 fixed to either one of opposite lateral sides of the seat assembly 1, the noncircular portion of the control shaft 20 is inserted through a hole 15e of the small-diameter shank 15c of the internal-tooth gear 15 with a sufficient clearance therebetween, and then engaged with the noncircular portion 19d of the wedged-state release member 19 in a non-rotatable manner relative thereto.

The noncircular portion 20a is formed at each of opposite ends of the control shaft 20 to allow the control shaft 20 to be rotated in conjunction with the handle 7 and the gear unit U. In this embodiment, the noncircular portion 20a has an oval shape formed by pressingly deforming a pipe-like material of the control shaft 20 from both sides thereof. The noncircular hole 19d of the wedged-state release member 19 is formed in an oval shape conformable to the oval shape of the noncircular portion 20a.

While each of the noncircular portion 19d of the wedged-state release member 19 and the noncircular portion 20a of the control shaft 20 in this embodiment is formed in an oval shape, it may have any other suitable noncircular shape, such as a polygonal shape. Further, the control shaft 20 may be entirely formed as the noncircular portion 20a through an extrusion process or a drawing process. Instead of engaging the noncircular portion 19d of the wedged-state release member 19 with the noncircular portion 20a of the control shaft 20 in a non-rotatable manner relative thereto, a circular-shaped portion of the wedged-state release member 19 may be fitted into a circular-shaped hole of the control shaft 20, and then crimpingly joined together in a non-rotatable manner relative to one another. Alternatively, the wedged-state release member 19 and the control shaft 20 may be designed, respectively, to have a noncircular-shaped shank fixed thereto or formed therein and a corresponding noncircular-shaped hole formed therein. In this case, the noncircular-shaped shank may be engaged with the noncircular-shaped hole in a non-rotatable manner relative to one another. The wedged-state release member 19 can be prepared by subjecting a metal plate to a press forming process, or through a zinc die-casting process, or a plastic molding process.

In an operation for fixedly attaching the handle 7 to be manually rotated, to one end of the control shaft 20, a corresponding one of the noncircular portions 20a is protruded outward, and inserted into a shaft-receiving portion 7a (see FIG. 1) formed in the handle 7 in a non-rotatable manner. Alternatively, in a type having no control shaft 20, the wedged-state release member 19 may be designed to be rotated directly by the handle 7.

When the control shaft 20 (or the wedged-state release member 19) is rotated by an electric motor in place of the handle 7, a device (such as a gear, belt or chain pulley) interlocking with the electric motor may be attached to an appropriate position of the control shaft 20.

For example, in FIG. 7, when the wedged-state release member 19 is rotated clockwise according to rotation of the control shaft 20 in conjunction with a manual operation of the handle 7, one edge 19f of the wedged-state release portion 19e is brought into contact with the leading edge 16c of the wedge member 16A, to move the wedge member 16A clockwise so as to loosen the wedged state of the wedge member 16A. In conjunction with the clockwise movement of the wedge member 16A, the wedge member 16B is also moved clockwise through the spring member 18.

Thus, the pair of wedge members 16A, 16B are moved together with the spring 10 circularly in the eccentric space 10, so that the small-diameter shank 15c of the internal-tooth gear 15 is eccentrically moved relative to the large-diameter hole 4b of the external-tooth gear 14 to allow an engagement position of the internal teeth 15a relative to the external teeth 14b to be changed (when the handle 7 is manually rotated 360 degrees, a wedge members 16A, 16B are moved one round, and an internal-teeth gear 15 is rotated by an angle equivalent to one of the external teeth of the external-tooth gear 14). Thus, an angle of the second bracket 5 relative to the first bracket 4, i.e. a frontward/rearward reclining angle of the seat back 3, can be adjusted.

Figure 10A:
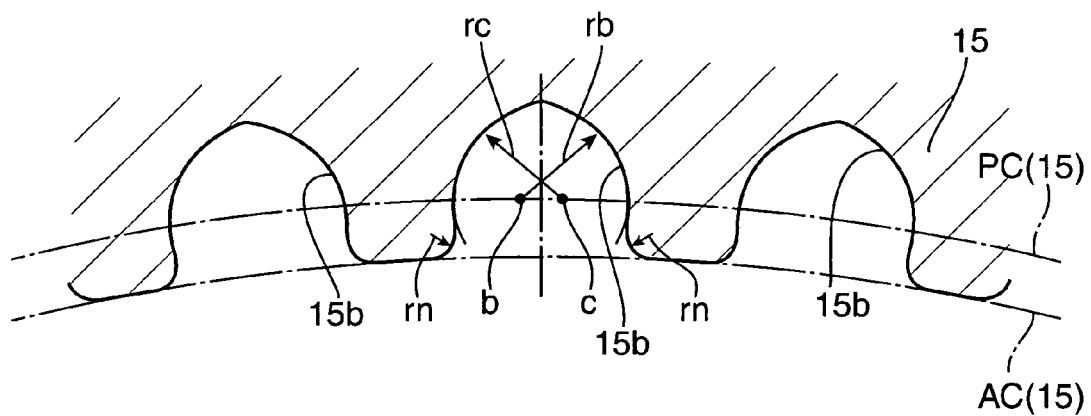
FIG. 10A is an enlarged view showing internal teeth.
Figure 10B:
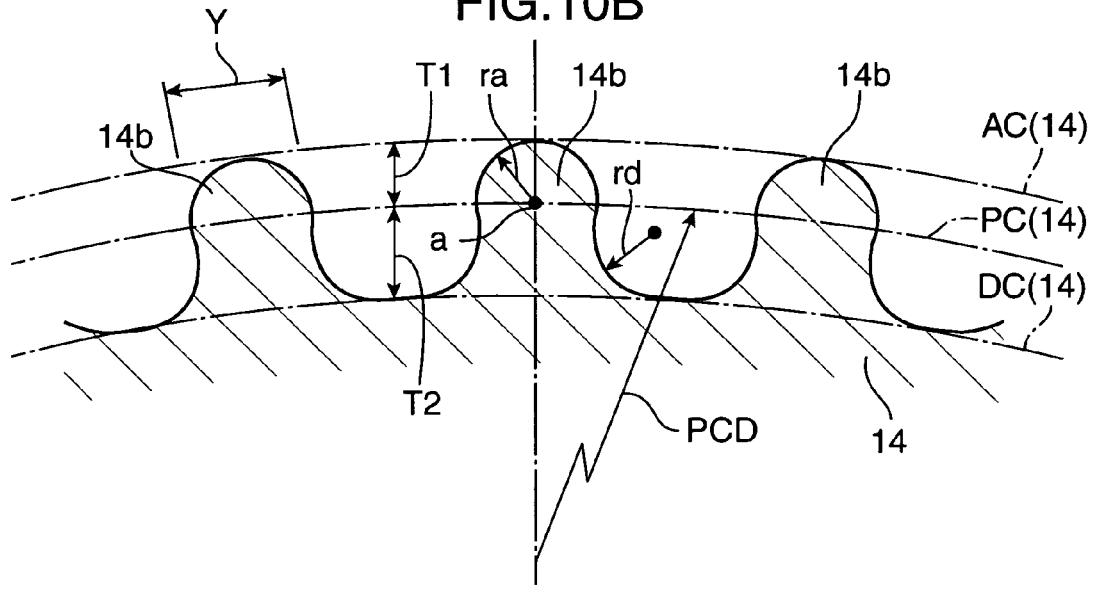
FIG. 10B is an enlarged view showing external teeth.

As specifically shown in FIG. 10, each of the external teeth 14b of the external-tooth gear 14 is designed such that a half-round shape drawn using a radius "ra" having a single center defined by a point "a" on the reference circle PC (14) is formed in a region of an addendum T1 or in a range between a reference circle PC (14) and an addendum or tip circle AC (14), and an undercut shape is formed in a region of a dedendum T2 or in a range between the reference circle PC (14) and a dedendum or root circle DC (14).

The reference circle PC (14) has an arc shape. Thus, in the strict sense, the region of the addendum T1 in each of the external teeth 14b has an approximately half-round shape until the above half-round shape drawn by the radius "ra" comes into contact with the arc of the reference circle PC (14).

Preferably, the undercut shape in the region of the dedendum T2 is formed as an arc shape which is drawn by a radius "rb" in such a manner as to be continuously connected to the root circle DC (14). This undercut shape makes it possible to eliminate the risk of formation of a step at a joint between the respective regions of the addendum T1 and the dedendum T2, so as to provide enhanced strength in the external teeth 14b.

Each of the internal teeth 15b of the internal-tooth gear 15 is designed to be formed as an arc shape free of interference with the region of the half-round addendum T1 in a corresponding one of the external teeth 14b of the external-tooth gear 14. Preferably, the arc shape of the internal tooth 15b in the internal-tooth gear 15 is formed as a combination of two quarter-round shapes drawn, respectively, using radii "rb", "rc" having two centers defined by points "b", "c" on the reference circle PC (15). Preferably, the internal tooth 15b has an undercut shape formed as an arc shape which is drawn by a radius "rn" in such a manner as to be continuously connected to the radii "rb", "rc" and the tip circle AC (15) designed to be free of interference with the root circle DC (14) of the external tooth.

As above, each of the external teeth 14b of the external-tooth gear 14 is designed such that a half-round shape having a single center defined by a point "a" on the reference circle PC (14) is formed in the region of the addendum T1 or in the range between the reference circle PC (14) and the tip circle AC (14), and an undercut shape is formed in the region of the dedendum T2 or in the range between the reference circle PC (14) and the root circle DC (14). Further, each of the internal teeth 15b of the internal-tooth gear 15 is designed to be formed as an arc shape free of interference with the region of the half-round addendum T1.

Figure 11A:
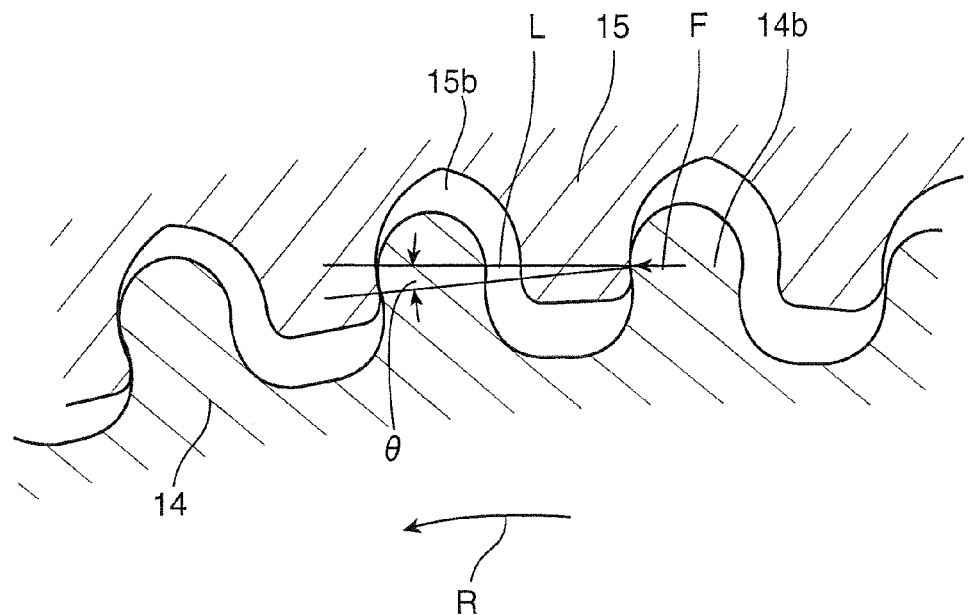
Figure 11B:
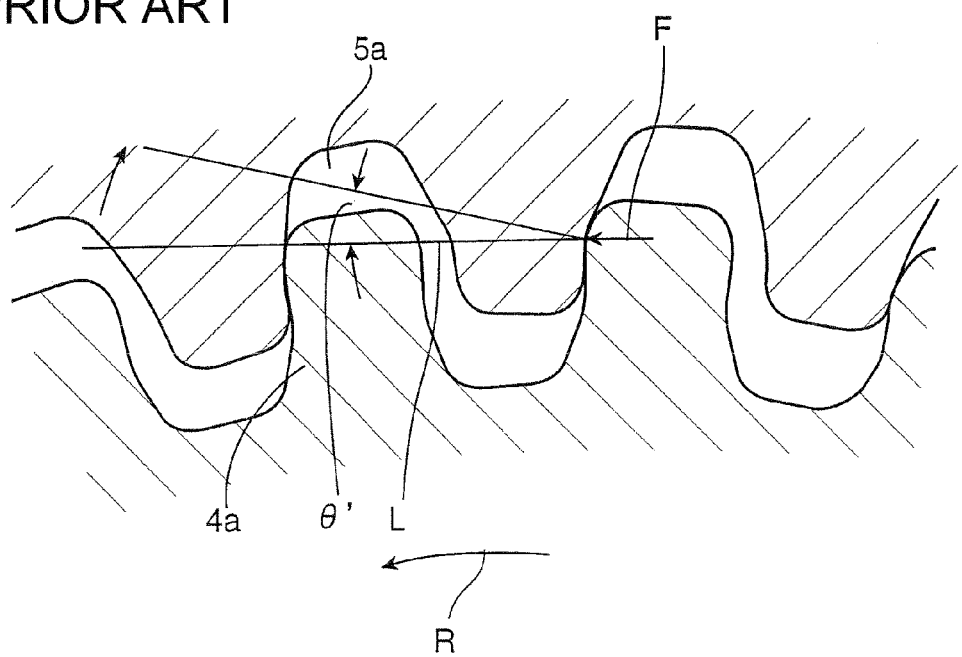
FIG. 11B is an enlarged view showing an engagement state of internal and external teeth in a conventional bracket angle adjustment mechanism.
Figure 12A:
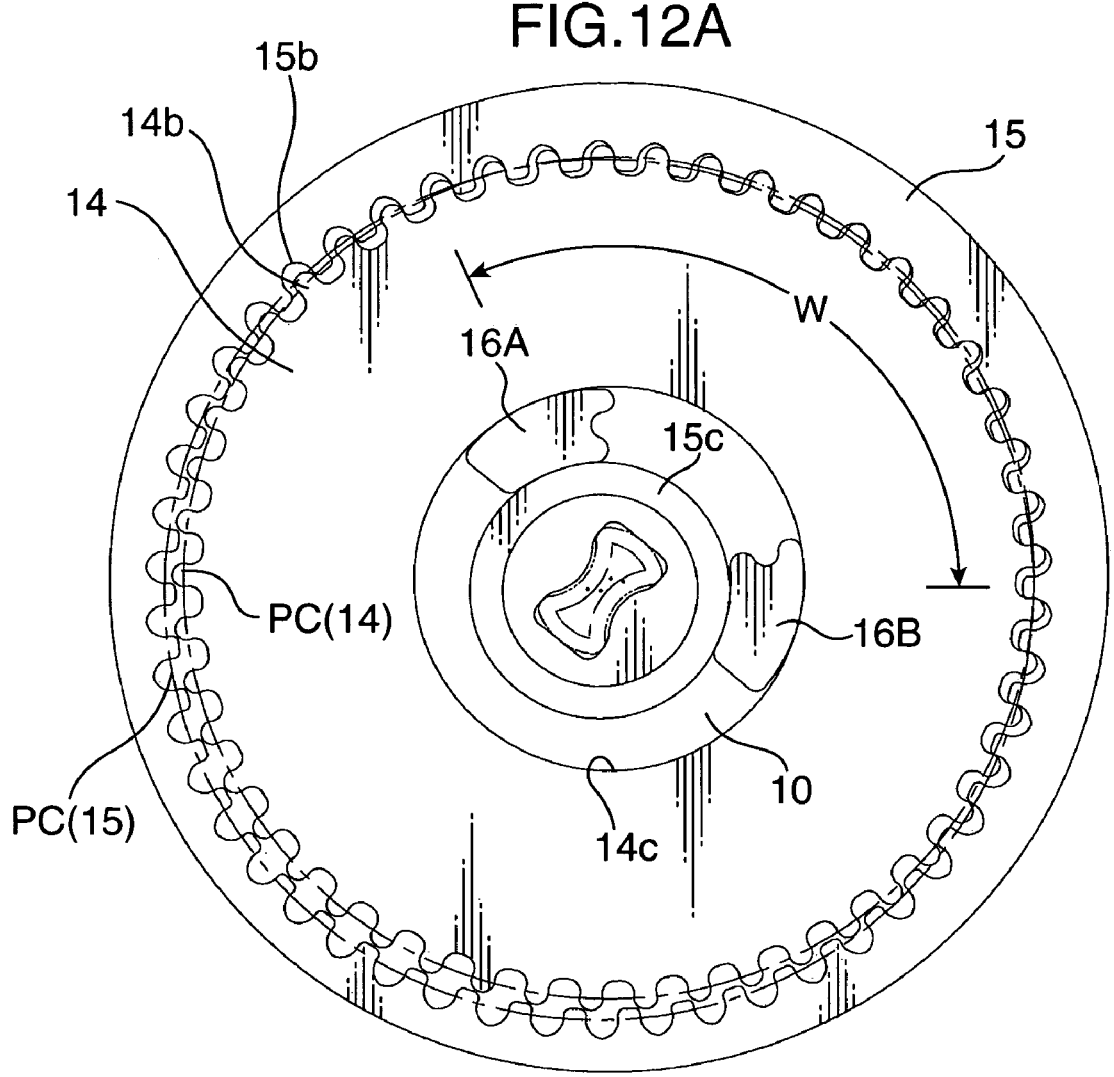
FIG. 12A is a front view showing an engagement state thereof.
Figure 12B:
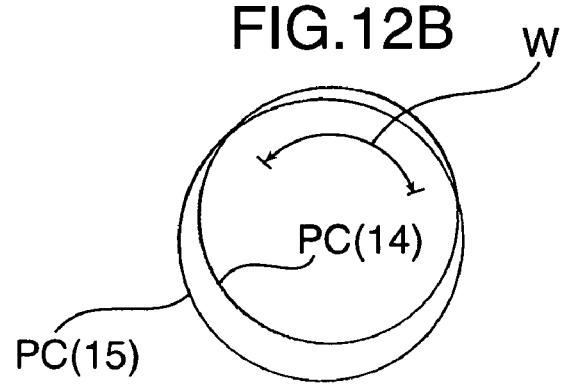
FIG. 12B is a schematic diagram showing respective reference circles of the internal teeth and external teeth thereof.

According to the above shapes, as shown in FIG. 11A, when the external-tooth gear 14 is rotated counterclockwise R, a load F of the external tooth 14b having a half-round-shaped region in the addendum T1 constantly acts on the arc-shaped internal tooth 15b at a right angle in a rotation direction. Thus, as compared with a pressure angle θ' between the external and internal teeth 4a, 5a with a conventional involute tooth profile as shown in FIG. 11B, a pressure angle θ between the external and internal teeth 14b, 15b becomes smaller. This provides enhanced transmission efficiency to allow an operating force for rotating the control shaft 20 to be reduced. In addition, as compared with the conventional pressure angle θ', the pressure angle θ is located on the inward side relative to a tangent line L. This makes it possible to reduce a load acting on the control shaft 20. Furthermore, as shown in FIGS. 12A and 12B, a range W having an interest between the reference circle PC (14) of the external teeth 14b and the reference circle PC (15) of the internal teeth 15b is created. Thus, the engagement between the external teeth 14b and the internal teeth 15b becomes deeper in this region.

According to the above bracket angle adjustment mechanism, in an operation for rotating the control shaft 20 using the handle 7, the handle 7 can be manually rotated by a smaller operating force. Otherwise, when the control shaft 20 is rotated using an electric pump, the control shaft 20 can be rotated by a lower output power of the electric motor. This makes it possible to use a smaller/lighter electric motor.

In addition, the above advantages can be obtained only by changing the shapes of the external teeth 14b of the external-tooth gear 14 and the internal teeth 15b of the internal-tooth gear 15. Thus, the bracket angle adjustment mechanism can be produced in a significantly simplified structure at a low cost.

Figure 13:
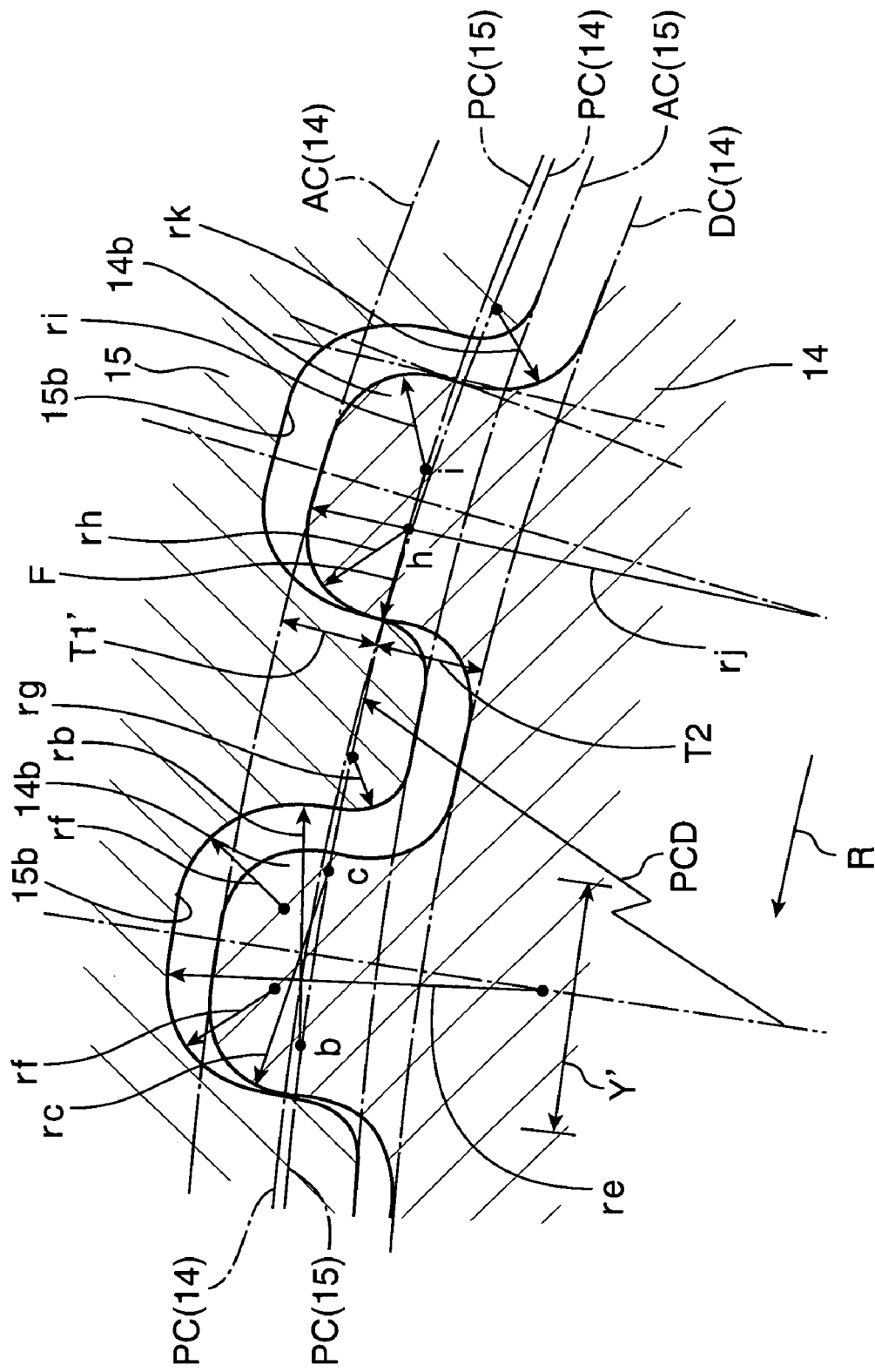
FIG. 13 is a fragmentary enlarged view showing one modification of the internal teeth and the external teeth.

FIG. 13 is one modification in shape of the external teeth 14b of the external-tooth gear 14 the internal teeth 15b of the internal-tooth gear 15.

As specifically shown in FIG. 13, in each of the external teeth 14b of the external-tooth gear 14, a tip portion is cut out to provide a reduced addendum T1' or a reduced distance between the reference circle PC(14) and the tip circle AC (14). More specifically, as compared with the addendum T1 of the external tooth 14b in the external-tooth 14 illustrated in FIG. 10, the addendum T1' is reduced by about 30 to 50% (T1'<T1).

Then, the addendum T1' is designed to have an approximately trapezoidal shape formed by combining two quarter-round shapes which are drawn, respectively, using radii "rh", "ri" having two centers defined by points "h", "i" on the reference circle PC (14), so as to provide an increased tooth thickness Y'. More specifically, as compared to a thickness Y of the external tooth 14b in the external-tooth gear 14 illustrated in FIG. 10, tooth thickness Y' is increased by about 20 to 30% (Y1'<Y1).

Then, an arc of a radius "rj" or a straight line is drawn to allow the respective arcs drawn by the radii "rh", "ri" to be continuously connected to one another, and a region of a dedendum T2 or a range between a reference circle PC (14) and a root circle DC (14) is formed as an undercut shape. The reference circle PC (14) has an arc shape. Thus, in the strict sense, the region of the addendum T1' in each of the external teeth 14b has an approximately half-round shape until the above quarter-round shape drawn by the radii "rh", "ri" comes into contact with the arc of the reference circle PC (14).

Each of the internal teeth 15b of the internal-tooth gear 15 is designed to be formed as an approximately trapezoidal shape free of interference with the region of the approximately trapezoidal-shaped addendum T1'. As described above, this approximately trapezoidal shape in each of the internal teeth 15b of the internal-tooth gear 15 is obtained by: cutting a tooth tip thereof in conformity to the external teeth 14b of the external-tooth gear 14 having the reduced addendum T1 through cutout of its tooth tip; combining two quarter-round shapes which are drawn, respectively, using radii "rb", "rc" having two centers defined by points "b", "c" on the reference circle PC (15); drawing arcs using radii "rf", "rf" in such a manner as to continuously extend from respective quarter-round shapes drawn using the radii "rb", "rc"; and drawing an arc using a radius "re" or a straight line in such a manner as to continuously connect the respective arcs drawn using the radii "rf", "rf".

As above, in each of the external teeth 14b of the external-tooth gear 14, the region of the addendum T1' or the range between the reference circle PC (14) and the tip circle AC (14) is lowed, and two quarter-round shapes (radii "rb", "rc") having two centers defined by points "h", "i" on the reference circle PC (14) are combined to form an approximately trapezoidal shape so as to provide an increased tooth thickness. Further, the dedendum T2 or the region between the reference circle PC (14) and the root circle DC (14) is formed as an undercut shape, and the internal tooth 15b in the internal-tooth gear 15 is formed as an approximately trapezoidal shape free of interference with the addendum T1'.

According to this modification, given that the external-tooth gear 14 is rotated counterclockwise R, a load F of the external tooth 14b having an approximately trapezoidal-shaped region in the addendum T1' constantly acts on the approximately trapezoidal-shaped internal tooth 15b at a right angle in a rotation direction. Thus, a pressure angle θ becomes smaller as with the aforementioned embodiment illustrated in FIG. 10. This provides enhanced transmission efficiency to allow an operating force for rotating the control shaft 20 to be reduced. In addition, as with the embodiment illustrated in FIG. 10, the pressure angle θ is located on the inward side relative to a tangent line L. This makes it possible to reduce a load acting on the control shaft 20. Furthermore, as with the embodiment illustrated in FIG. 10, a range W having an interest between the reference circle PC (14) of the external teeth 14b and the reference circle PC (15) of the internal teeth 15b is created. Thus, the engagement between the external teeth 14b and the internal teeth 15b becomes deeper in this region.

According to the above modification, as with the embodiment illustrated in FIG. 10, in an operation for rotating the control shaft 20 using the handle 7, the handle 7 can be manually rotated by a smaller operating force. Otherwise, when the control shaft 20 is rotated using an electric pump, the control shaft 20 can be rotated by a lower output power of the electric motor. This makes it possible to use a smaller/lighter electric motor. In addition, the above advantages can be obtained only by changing the shapes of the external teeth 14b of the external-tooth gear 14 and the internal teeth 15b of the internal-tooth gear 15. Thus, the bracket angle adjustment mechanism can be produced in a significantly simplified structure at a low cost.

Particularly, according to the modification illustrated in FIG. 13, a force acting in a direction causing disengagement between the external teeth 14b and the internal teeth 15b can be suppressed. Further, in the external teeth, the region of the addendum T1 is lowered, and two quarter-round shapes having two centers defined by points "h", "i" on the reference circle PC (14) are combined to form an approximately trapezoidal shape so as to provide an increased tooth thickness. This makes it possible to prevent an axial bending of the external-tooth gear 14, and eliminate the risk of deformation in the small-diameter shank 15c of the internal-tooth gear 15 due to the wedge members 16A, 16B pressed by the large-diameter hole 14c.

Figure 14:
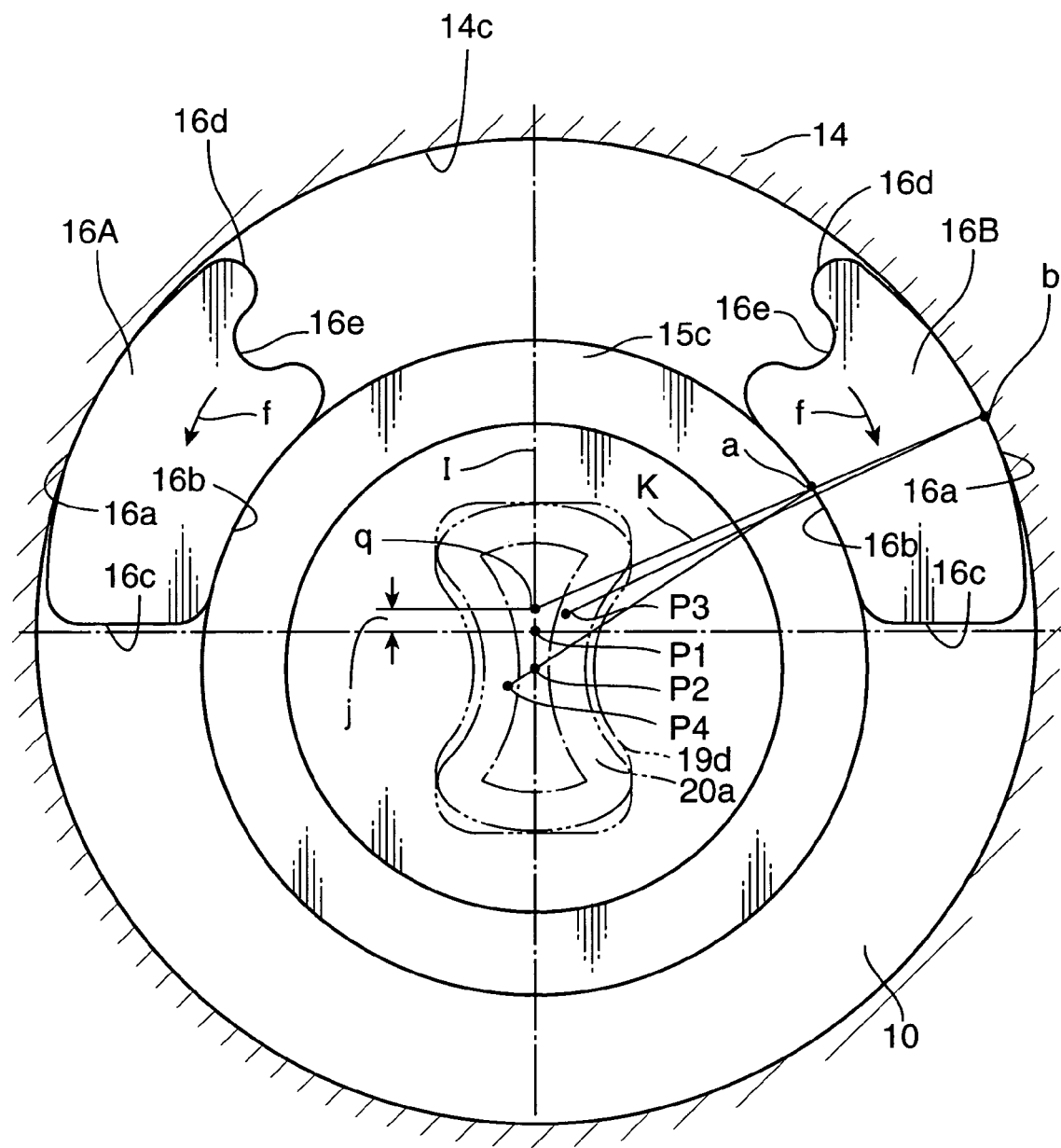
FIG. 14 is a front view showing a wedge member of the bracket angle adjustment mechanism in FIG. 1, in the state when no load acts on a seat back of the vehicle seat assembly.

As specifically shown in FIG. 14, each of the pair of wedge members 16A, 16B in the above embodiment has an arc-shaped outer surface 16a having a diameter slightly less than that of the arc-shaped inner peripheral surface of the large-diameter hole 14c of the external-tooth gear 14, and an arc-shaped inner surface 16b having a diameter slightly greater than that of the arc-shaped outer peripheral surface of the small-diameter shank 15c of the internal-tooth gear 15.

FIG. 14 shows a state when no load acts on the seat back 3 (second bracket 5). The bracket angle adjustment mechanism according to this embodiment is designed such that, in this state, a line K connecting between an internal-tooth receiving point "a" where the arc-shaped inner surface 16b of the wedge member 16B comes into contact with the arc-shaped outer peripheral surface of the small-diameter shank 15c of the internal-tooth gear 15, and an external-tooth receiving point "b" where the arc-shaped outer surface 16a of the wedge member 16B comes into contact with the arc-shaped inner peripheral surface of the large-diameter hole 14c of the external-tooth gear 14, is located outward or offset relative to each of a gear center P2 of the external-tooth gear 14 and a gear center P1 of the internal-tooth gear 15. The line K is spaced apart from the gear center P1 by a distance "j", and an intersecting point "q" between the line K and a line I extending from the gear center P1, in the distance "j", corresponds to a force application point or action point of the internal-tooth receiving point "a" and the external-tooth receiving point "b" of the wedge member 16B. In FIG. 14, P3 indicates a center of the arc-shaped outer surface 16a of the wedge member 16B, and P4 indicates a center of the arc-shaped inner surface 16b of the wedge member 16B. Although not shown herein, the wedge member 16A has the same effects as those of the wedge member 16B as well as the following effects.

As shown in FIG. 15, when a load F is imposed on the second bracket 5 from the seat back 3 clockwise, the load F acts on the small-diameter shank 15c of the internal-tooth gear 15, on the basis of an engagement point between the internal teeth 15b of the internal-tooth gear 15 and the external teeth 14b of the external-tooth gear 14. When the load F is received at the internal-tooth receiving point A, and transmitted to the external-tooth receiving point B through the wedge member 16B, the line K connecting between the internal-tooth receiving point A and the external-tooth receiving point B is located outward relative to the gear center P2 of the external-tooth gear 14 and the gear center P1 of the internal-tooth gear 15. Thus, the distance "j" is increased to a distance "J", and the action point "q" is moved to an action point "Q", so that the wedge member 16B receives a turning force (see the arrow H) around the external-tooth receiving point B.

Thus, a portion of the arc-shaped outer surface 16a of the wedge member 16B ranging from the external-tooth receiving point B to the trailing edge thereof strongly bites into or contacts the arc-shaped inner peripheral surface of the large-diameter hole 14c of the external-tooth gear 14, and a portion of the arch-shaped inner surface 16b of the wedge member 16B ranging from the internal-tooth receiving point A to the leading edge thereof strongly bites into or contacts the arc-shaped outer peripheral surface of the small-diameter shank 15c of the internal-tooth gear 15. In this manner, even if the load F is imposed on the second bracket 5 from the seat back 3, the wedge member 16 B is urged in a biting or contact direction to reduce a shock to be given to the wedge member 16B, so as to prevent the seat back 3 from being reclined. The same operation and effect as those described above can also be obtained when a counterclockwise load F is imposed on the on the second bracket 5 from the seat back 3.

In addition, a force causing release of the biting or wedged state is reduced. This makes it possible to use a smaller spring with a lower spring or biasing force as the spring member 18, and thereby allow the spring member 18 to have outer dimensions for being adequately housed in an inner space of the large-diameter hole 14c of the external-tooth gear 14. The wedge members 16A, 16B can also be reduced in size, such as length.

Further, each of the wedge members 16A, 16B has the arc-shaped outer surface 16a having a diameter slightly less than that of the arc-shaped inner peripheral surface of the large-diameter hole 14c of the external-tooth gear 14, and the arc-shaped inner surface 16b having a diameter slightly greater than that of the arc-shaped outer peripheral surface of the small-diameter shank 15c of the internal-tooth gear 15. Thus, the arc-shaped outer surfaces 16a and the arc-shaped outer surfaces 16b of the wedge members 16A, 16B are always moved circularly in the eccentric space 10 with a small clearance. This allows variations in the concentric space 10 due to vitiations in machining accuracy of an arc-shaped inner peripheral surface of the large-diameter hole 14c of the external-tooth gear 14 and an arc-shaped outer peripheral surface of the small-diameter shank 15c of the internal-tooth gear 15, to be absorbed by the wedge members 16A, 16B.

In the above embodiment, as to respective circumferential lengths of the arc-shaped outer surface 16a and the arc-shaped inner surface 16b in each of the wedge members 16A, 16B, the arc-shaped outer surface 16a is longer, and the arc-shaped inner surface 16b is shorter (small in area). This conventional setting of circumferential lengths involves the risk of concentration of load in the small-diameter shank 15c of the internal-tooth gear 15 due to increase in surface pressure of the arc-shaped inner surface 16b having a shorter length. Specifically, referring to FIG. 15, the circumferential length of the arc-shaped inner surface 16b in each of the wedge members 16A, 16B is about ⅛ of the circumferential length of the small-diameter shank 15c.

With a focus on this point, as shown in FIG. 16, the arc-shaped inner surface 16b in each of the wedge members 16A, 16B is designed to increase a circumferential length in such a manner that it is to be about ⅓ of the circumferential length of the small-diameter shank 15c. While the arc-shaped inner surface 16b in FIG. 15 has a circumferential length greater than that of the arc-shaped outer surfaces 16a (the circumferential length of the arc-shaped inner surface 16b is about ¼ of the circumferential length of the small-diameter shank 15c), it may have approximately the same circumferential length as that of the small-diameter shank 15c.

Further, in each of the wedge members 16A, 16B, a cutout portion 16f is formed in a portion of the arc-shaped outer surfaces 16a on the side of the leading edge 16c, and the wedged-state release member 19 is in contact with the cutout portion 16f.

Figure 16A:
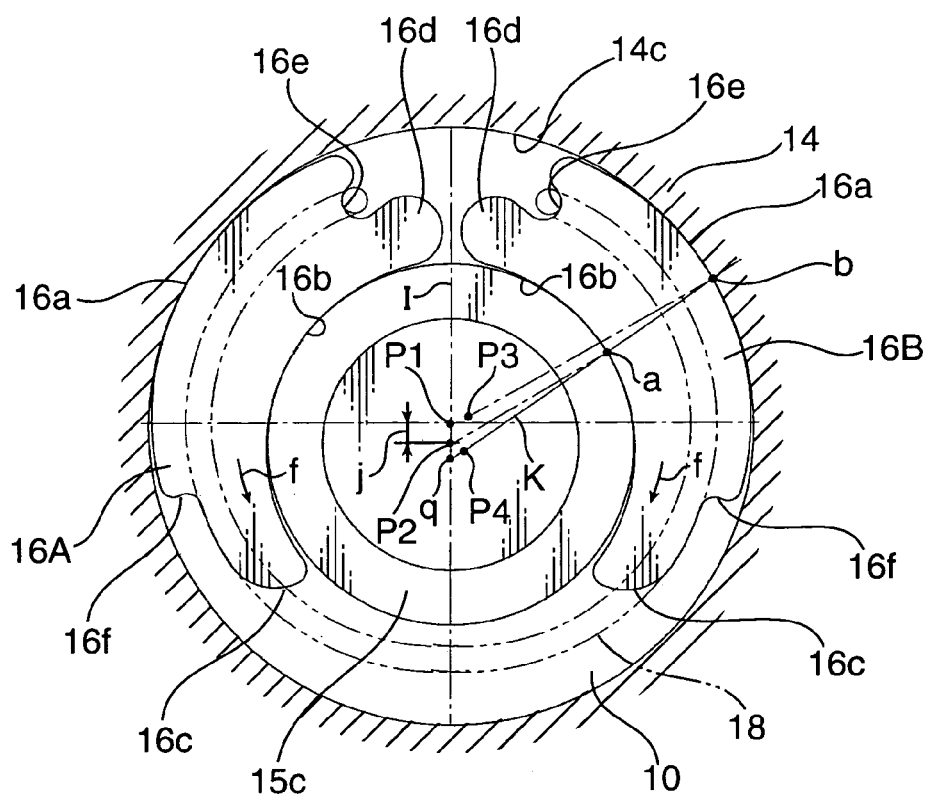
FIG. 16A is a front view showing the wedge member in a normal position.

FIG. 16A shows a state when no load acts on the seat back 3 (second bracket 5). In this state, a line K connecting in between an internal-tooth receiving point "a" where the arc-shaped inner surface 16b of the wedge member 16B comes into contact with the arc-shaped outer peripheral surface of the small-diameter shank 15c of the internal-tooth gear 15, and an external-tooth receiving point "b" where the arc-shaped outer surface 16a of the wedge member 16B comes into contact with the arc-shaped inner peripheral surface of the large-diameter hole 14c of the external-tooth gear 14, is located outward or offset relative to each of a gear center P2 of the external-tooth gear 14 and a gear center P1 of the internal-tooth gear 15. The line K is spaced apart from the gear center P1 by a distance "j", and an intersecting point "q" between the line K and a line I extending from the gear center P1, in the distance "j", corresponds to an action point of the internal-tooth receiving point "a" and the external-tooth receiving point "b" of the wedge member 16B. In FIG. 16A, P3 indicates a center of the arc-shaped outer surface 16a of the wedge member 16B, and P4 indicates a center of the arc-shaped inner surface 16b of the wedge member 16B. Although not shown herein, the wedge member 16A has the same effects as those of the wedge member 16B as well as the following effects.

Figure 16B:
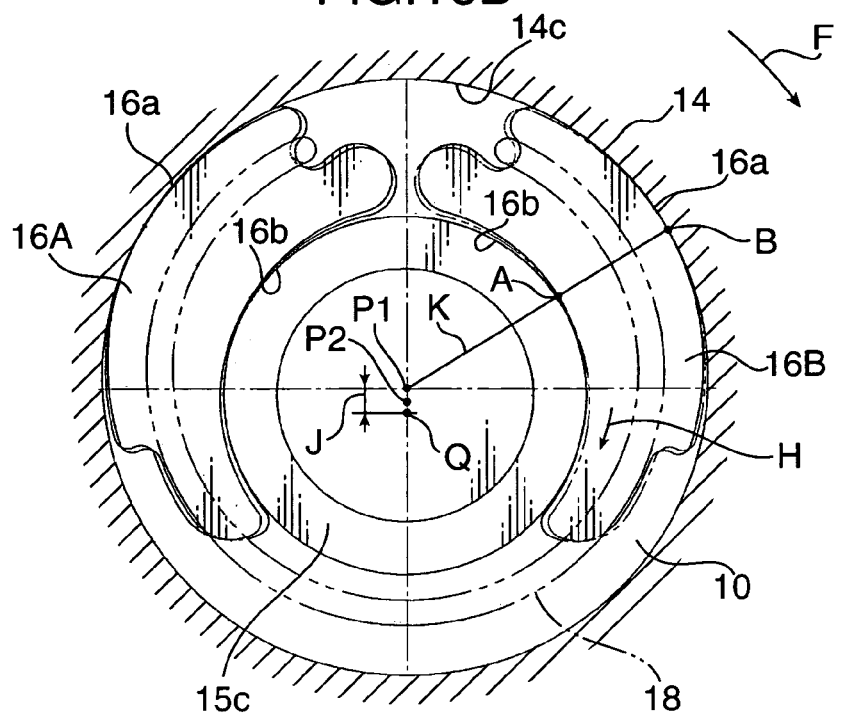
FIG. 16B is a front view showing the wedge member in a wedged position.

As shown in FIG. 16B, when a load F is imposed on the second bracket 5 from the seat back 3 clockwise, the load F acts on the small-diameter shank 15c of the internal-tooth gear 15, on the basis of an engagement point between the internal teeth 15b of the internal-tooth gear 15 and the external teeth 14b of the external-tooth gear 14. When the load F is received at the internal-tooth receiving point A, and transmitted to the external-tooth receiving point B through the wedge member 16B, the line K connecting between the internal-tooth receiving point A and the external-tooth receiving point B is located outward relative to the gear center P2 of the external-tooth gear 14 and the gear center P1 of the internal-tooth gear 15. Then, if the distance "j" is reduced to a distance "J" (distance j<J), and the action point q is moved to an action point Q, the line K connecting between the internal-tooth receiving point A and the external-tooth receiving point B in the wedge member 16B will be kept at a position located outward relative to the gear center P2 of the external-tooth gear 14 and the gear center P1 of the internal-tooth gear 15, so that the wedge member 16B receives a turning force (see the arrow H) around the external-tooth receiving point B.

Thus, a portion of the arc-shaped outer surface 16a of the wedge member 16B ranging from the external-tooth receiving point B to the trailing edge thereof strongly bites into or contacts the arc-shaped inner peripheral surface of the large-diameter hole 14c of the external-tooth gear 14, and a portion of the arch-shaped inner surface 16b of the wedge member 16B ranging from the internal-tooth receiving point A to the leading edge thereof strongly bites into or contacts the arc-shaped outer peripheral surface of the small-diameter shank 15c of the internal-tooth gear 15. In this manner, even if the load F is imposed on the second bracket 5 from the seat back 3, the wedge member 16 B is urged in a biting or contact direction to reduce a shock to be given to the wedge member 16B, and prevent the seat back 3 from being reclined. The same operation and effect as those described above can also be obtained when a counterclockwise load F is imposed on the on the second bracket 5 from the seat back 3.

In addition, a force causing release of the biting or wedged state is reduced. This makes it possible to use a smaller spring with a lower spring or biasing force as the spring member 18, and thereby allow the spring member 18 to have outer dimensions for being adequately housed in an inner space of the large-diameter hole 14c of the external-tooth gear 14.

Further, as to the respective circumferential lengths of the arc-shaped outer surface 16a and the arc-shaped inner surface 16b in each of the wedge members 16A, 16B, they are approximately the same, or the arc-shaped inner surface 16b is relatively longer (approximately the same or larger in area). Thus, a surface pressure of the arc-shaped inner surface 16b can be reduced to reduce the risk of concentration of load in the small-diameter shank 15c of the internal-tooth gear 15.

Figure 17A:
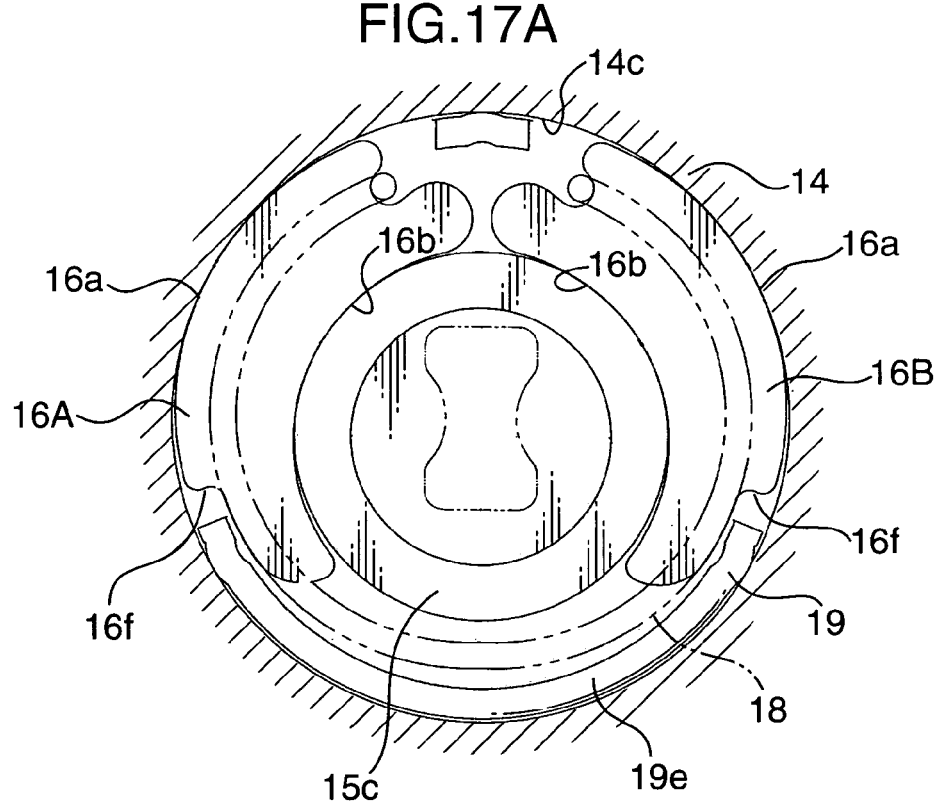
FIG. 17A is a front views showing them in a normal position.
Figure 17B:
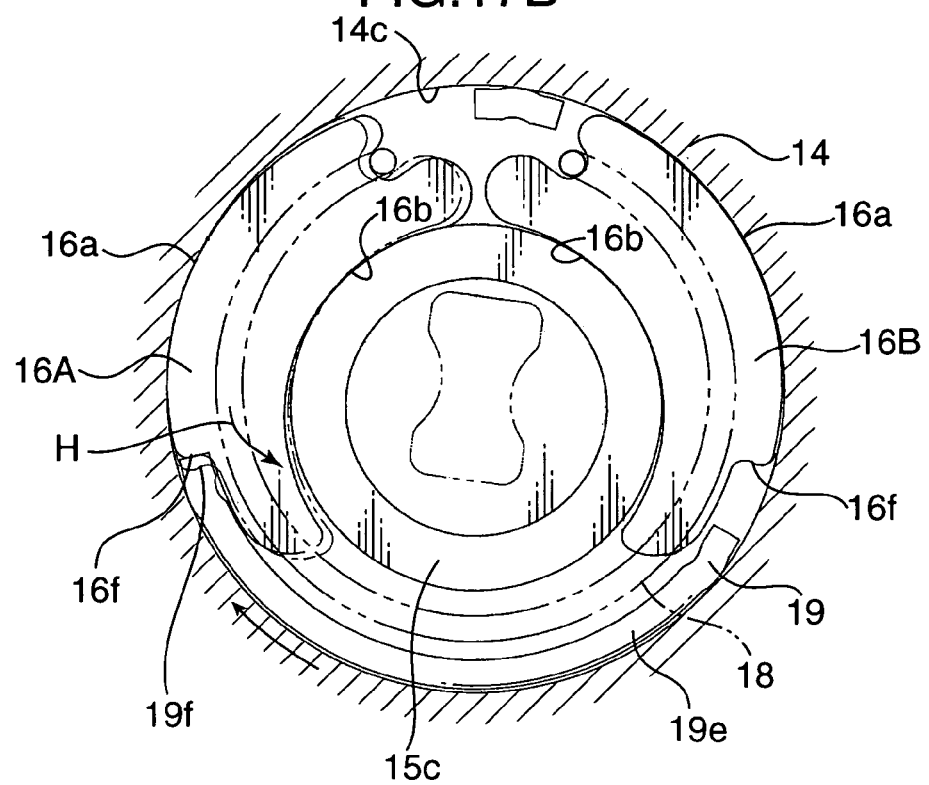
FIG. 17B is a front views showing them in a non-wedged position.

As shown in FIGS. 17A and 17B, when the wedged-state release member 19 is rotated clockwise (see the arrow), for example, as shown in FIG. 17B, according to rotation of the control shaft 20 in conjunction with a manual operation of the handle 7, one edge 19f of the wedged-state release member 19 is brought into contact with the cutout portion 16f of the wedge member 16A, to move the wedge member 16A clockwise so as to loosen the wedged state of the wedge member 16A. In conjunction with the clockwise movement of the wedge member 16A, the wedge member 16B is also moved clockwise through the spring member 18. Thus, an angle of the second bracket 5 relative to the first bracket 4, i.e. a frontward/rearward reclining angle of the seat back 3, can be adjusted in the same manner as that in the aforementioned embodiment. In the above operation, the wedged-state release portion 19e of the wedged-state release member 19 is brought into contact with the cutout portion 16f formed in the arc-shaped outer surface 16a of the wedge member 16A. That is, the wedged-state release portion 19e presses a portion of the wedge member 16B located close to the outer surface thereof, against the aforementioned turning force (see the arrow H), to allow the wedge member to be moved in a direction opposite to that of the turning force. Thus, the wedged state of the wedge member can be more easily relaxed or released.

In the above embodiment, the wedged-state release member 19 is held by the external-tooth gear 14 in such a manner that the outer peripheral surface of the wedged-state release member 19 is rotatably fitted in the large-diameter hole 14c formed in the central region of the external-tooth gear 14. This allows the wedged-state release member 19 to be stably rotated along the large-diameter hole 14*c* of the external-tooth gear 14 and to be increased in size so as to have enhanced strength. In addition, this makes it possible to simplify the shape of the wedged-state release member 19 so as to facilitate reduction in production cost.

In the above embodiment, in the state after the wedged-state release member 19 is fitted in the large-diameter hole 14*c*, the clearance grooves 19*a* can prevent needless interference between the wedged-state release member 19 and the wedge members 16A, 16B.

In the above embodiment, the control shaft 20 for selectively rotating the wedged-state release member 19 is fixed to the wedged-state release member 19 by inserting the noncircular portion (fixing portion) 20*a* of the control shaft 20 into the noncircular hole 19*d* of the wedged-state release member 19. Thus, the control shaft 20 is simply inserted into the hole 15*e* of the small-diameter shank 15*c* of the internal-tooth gear 15 in a non-fitting manner, so that the need for fitting the cylindrical-shaped portion of the wedged-state release member 19 into the small-diameter shank 15*c* of the internal-tooth gear 15 can be eliminated. This makes it possible to increase the wall thickness of the small-diameter shank 15*c* and the diameter of the control shaft 20 so as to provide enhanced strength thereof. Further, the control shaft 20 can be fixedly connected to the wedged-state release member 19 simply by inserting the noncircular portion 20*a* of the control shaft 20 into the noncircular hole 19*d* of the wedged-state release member 19, without the need for a spline connection between the cylindrical-shaped portion of the wedged-state release member 19 and the control shaft 20. Thus, the insertion/connection structure can be simplified.

While the bracket angle adjustment mechanism according to the above embodiment has been designed to adjust a relative angle between the brackets 4, 5 related to a reclining function of the vehicle seat assembly 1, it is understood that the present invention may be applied to any other type of bracket angle adjustment mechanism for adjusting a relative angle between one bracket 4 and the other bracket 5 for use, for example, in a lifter for a vehicle seat 1 or a vehicle power window apparatus.

As described above, an inventive bracket angle adjustment mechanism comprises a first bracket including an external-tooth gear, a second bracket including an internal-tooth gear which has a larger number of internal teeth than that of external teeth of the external-tooth gear, a pair of wedge members fitted in an eccentric space which is defined between a large-diameter hole formed in a central region of the external-tooth gear and a small-diameter shank constituting a central portion of the internal-tooth gear, in a state when the external-tooth gear and the internal-tooth gear are partly engaged with one another, a spring member applying a biasing force to each of the pair of wedge members in a wedging direction, and a wedged-state release member disposed between respective wedging-directional leading edges of the pair of wedge members. The wedged-state release member is operable, when rotated by a control shaft associated therewith, to move the pair of wedge members together with the spring member in a wedged-state release direction circularly in the eccentric space, whereby the small-diameter shank is eccentrically moved relative to the large-diameter hole to allow an engagement position of the internal-tooth gear relative to the external-tooth gear to be changed so as to adjust an angle of the second bracket relative to the first bracket. Each of the external teeth of the external-tooth gear has in at least one portion an arc shape allowing a force for rotating the control shaft to be reduced, and each of the internal teeth of the internal-tooth gear has a shape free of interference with a region of an addendum in a corresponding one of the external teeth.

In the bracket angle adjustment mechanism, each of the external teeth of the external-tooth gear may have a half-round shape having a center defined by a single point on a reference circle of the external-tooth gear, in a region of an addendum between the reference circle and a tip circle of the external-tooth gear, and an undercut shape in a region of a dedendum between the reference circle and a root circle of the external-tooth gear. Further, each of the internal teeth of the internal-tooth gear may have an arc shape free of interference with the half-round-shaped addendum region of a corresponding one to the external teeth.

Alternatively, each of the external teeth of the external-tooth gear may have an approximately trapezoidal shape formed by reducing a region of an addendum between a reference circle and a tip circle of the external-tooth gear, and combining two quarter-round shapes having centers defined by two points on the reference circle, so as to provide an increase tooth thickness, and an undercut shape in a region of a dedendum between the reference circle and a root circle of the external-tooth gear. Further, each of the internal teeth of the internal-tooth gear may have an approximately trapezoidal shape free of interference with the addendum region of a corresponding one to the external teeth.

In the bracket angle adjustment mechanism, the undercut shape of the dedendum region may be an arc shape continuously connected to the addendum region.

In the bracket angle adjustment mechanism, each of the internal teeth of the internal-tooth gear may have a shape formed by combining two quarter-round shapes having centers defined by two points on a reference circle of the internal-tooth gear.

The bracket angle adjustment mechanism may be used with a seat assembly having a seat back and a seat cushion to adjust a frontward/rearward angle of the seat back relative to the seat cushion. In this case, one of the first and second brackets is fixed to the seat back, and the other bracket is fixed to the seat cushion.

With these constructions, each of the external teeth of the external-tooth gear has in at least one portion an arc shape allowing a force for rotating the control shaft to be reduced, and each of the internal teeth of the internal-tooth gear has a shape free of interference with a region of an addendum in a corresponding one of the external teeth. This makes it possible to reduce the operating force for rotating the control shaft.

Each of the external teeth of the external-tooth gear may have a half-round shape having a center defined by a single point on a reference circle of the external-tooth gear, in a region of an addendum between the reference circle and a tip circle of the external-tooth gear, and an undercut shape in a region of a dedendum between the reference circle and a root circle of the external-tooth gear, and each of the internal teeth of the internal-tooth gear may have an arc shape free of interference with the half-round-shaped addendum region of a corresponding one to the external teeth. According to this feature, a turning force constantly acts on an engagement point between the half-round-shaped external tooth and the arc-shaped internal tooth on the reference circle, at a right angle in a rotation direction. Thus, as compared with a conventional involute tooth profile, a pressure angle becomes smaller to provide enhanced transmission efficiency. In addition, a range of the pressure angle is located inward (on the side of a rotational center) relatively a tangent line at the engagement point, and therefore the engagement between the external teeth and the internal teeth becomes deeper. Further, a range having an interest between the respective reference circles of the external teeth and the internal teeth is created. This also provides a deeper engagement between the external teeth and the internal teeth.

Thus, in an operation for rotating the wedged-state release member to rotate the external-tooth gear and then rotate the internal-tooth gear, an operating force for moving the wedged-state release member can be reduced, and therefore a load to be imposed on the wedged-state release member is reduced.

Further, when a turning force of the external teeth is transmitted to the internal teeth, or a turning force of the internal force is received by the external teeth, the above feature can reduce the risk that the force acts on the external teeth and the internal teeth in a direction causing disengagement therebetween. This is advantageous in terms of strength of the external teeth and the internal teeth. In particular, the undercut shape of the dedendum region in the external teeth may be an arc shape continuously connected to the addendum region to provide further enhanced strength in the external teeth.

In an operation for moving the wedged-state release member by rotating a handle, the handle can be manually rotated by a smaller operating force. When the wedged-state release member is moved using an electric pump, the wedged-state release member can be rotated by a lower output power of the electric motor. This makes it possible to use a smaller/lighter electric motor. In addition, the above advantages can be obtained only by changing the shapes of the external teeth of the external-tooth gear and the internal teeth of the internal-tooth gear. Thus, the bracket angle adjustment mechanism can be produced in a significantly simplified structure at a low cost.

Alternatively, each of the external teeth of the external-tooth gear may have an approximately trapezoidal shape formed by reducing a region of an addendum between a reference circle and a tip circle of the external-tooth gear, and combining two quarter-round shapes having centers defined by two points on the reference circle, so as to provide an increase tooth thickness, and an undercut shape in a region of a dedendum between the reference circle and a root circle of the external-tooth gear. Further, each of the internal teeth of the internal-tooth gear may have an approximately trapezoidal shape free of interference with the addendum region of a corresponding one to the external teeth. According to this feature, a turning force constantly acts on an engagement point between the half-round-shaped external tooth and the arc-shaped internal tooth on the reference circle, at a right angle in a rotation direction. Thus, as compared with a conventional involute tooth profile, a pressure angle becomes smaller to provide enhanced transmission efficiency. In addition, a range of the pressure angle is located inward (on the side of a rotational center) relatively a tangent line at the engagement point, and therefore the engagement between the external teeth and the internal teeth becomes deeper. Further, a range having an interest between the respective reference circles of the external teeth and the internal teeth is created. This also provides a deeper engagement between the external teeth and the internal teeth.

Thus, in an operation for rotating the wedged-state release member to rotate the external-tooth gear and then rotate the internal-tooth gear, an operating force for moving the wedged-state release member can be reduced, and therefore a load to be imposed on the wedged-state release member is reduced.

Further, when a turning force of the external teeth is transmitted to the internal teeth, or a turning force of the internal force is received by the external teeth, the above feature can reduce the risk that the force acts on the external teeth and the internal teeth in a direction causing disengagement therebetween. This is advantageous in terms of strength of the external teeth and the internal teeth. In particular, the undercut shape of the dedendum region in the external teeth may be an arc shape continuously connected to the addendum region to provide further enhanced strength in the external teeth.

In addition to the above advantage of being able to reduce he risk that the force acts on the external teeth and the internal teeth in a direction causing disengagement therebetween, the external teeth having the approximately trapezoidal shape formed by lowering the addendum region, and combining two quarter-round shapes having centers defined by two points on the reference circle, so as to provide an increase tooth thickness, can have enhanced strength. This makes it possible to prevent an axial bending of the external-tooth gear, and eliminate the risk of deformation in the small-diameter shank of the internal-tooth gear due to the wedge members pressed by the large-diameter hole.

In an operation for moving the wedged-state release member by rotating a handle, the handle can be manually rotated by a smaller operating force. When the wedged-state release member is moved using an electric pump, the wedged-state release member can be rotated by a lower output power of the electric motor. This makes it possible to use a smaller/lighter electric motor. In addition, the above advantages can be obtained only by changing the shapes of the external teeth of the external-tooth gear and the internal teeth of the internal-tooth gear. Thus, the bracket angle adjustment mechanism can be produced in a significantly simplified structure at a low cost.

This application is based on patent application Nos. 2004-379690 and 2005-298506 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A bracket angle adjustment mechanism comprising:
a first bracket including an external-tooth gear;
a second bracket including an internal-tooth gear which has a larger number of internal teeth than that of external teeth of the external-tooth gear;
a pair of wedge members fitted in an eccentric space which is defined between a large-diameter hole formed in a central region of the external-tooth gear and a small-diameter shank constituting a central portion of the internal-tooth gear, in a state when the external-tooth gear and the internal-tooth gear are partly engaged with one another;
a spring member applying a biasing force to each of the pair of wedge members in a wedging direction; and
a wedged-state release member disposed between respective wedging-directional leading edges of the pair of wedge members, the wedged-state release member being operable, when rotated by a control shaft associated therewith, to move the pair of wedge members together with the spring member in a wedged-state release direction around the eccentric space, whereby the small-diameter shank is eccentrically moved relative to the large-diameter hole to allow an engagement position of the internal-tooth gear relative to the external-tooth gear to be changed so as to adjust an angle of the second bracket relative to the first bracket, wherein each of the external teeth of the external-tooth gear has two arc shapes in an addendum region between a reference circle and a tip circle of the external-tooth gear, each of the two arc shapes having a center defined by a point on the reference circle and crossing a circumference of the reference circle, allowing a force for rotating the control shaft to be reduced, and each of the internal teeth of the internal-tooth gear has a shape free of interference with the addendum region in a corresponding one of the external teeth, each of the internal teeth of the internal-tooth gear having two arc shapes in a dedendum region between a reference circle and a root circle of the internal-tooth gear, each of the two arc shapes having a center defined by a point on the reference circle of the internal-tooth gear and crossing a circumference of the reference circle, a turning force of the external tooth acting on the internal tooth at a right angle in a rotation direction at an engagement point on both of the reference circles.

2. The bracket angle adjustment mechanism as defined in claim 1, wherein each of the external teeth has an undercut shape in a dedendum region between the reference circle and a root circle of the external-tooth gear, the undercut shape of the dedendum region being an arc shape continuously connected to the addendum region.

3. The bracket angle adjustment mechanism as defined in claim 1, wherein each of the internal teeth of the internal-tooth gear has a shape formed by combining two quarter-round shapes having centers defined by two points on the reference circle of the internal-tooth gear.

4. The bracket angle adjustment mechanism as defined in claim 1, which is used with a seat assembly having a seat back and a seat cushion to adjust a frontward/rearward angle of the seat back relative to the seat cushion, wherein one of the first and second brackets is fixed to the seat back, and the other bracket is fixed to the seat cushion.

5. The bracket angle adjustment mechanism as defined in claim 1, wherein:

each of the external teeth of the external-tooth gear has a half-round shape having a center defined by a single point on the reference circle of the external-tooth gear in the addendum region of the external teeth and an undercut shape in a dedendum region between the reference circle and a root circle of the external-tooth gear; and each of the internal teeth of the internal-tooth gear has an arc shape free of interference with the half-round-shaped addendum region of a corresponding one to the external teeth.

6. The bracket angle adjustment mechanism as defined in claim 5, wherein the undercut shape of the dedendum region is an arc shape continuously connected to the addendum region.

7. The bracket angle adjustment mechanism as defined in claim 5, which is used with a seat assembly having a seat back and a seat cushion to adjust a frontward/rearward angle of the seat back relative to the seat cushion, wherein one of the first and second brackets is fixed to the seat back, and the other bracket is fixed to the seat cushion.

8. The bracket angle adjustment mechanism as defined in claim 1, wherein:

each of the external teeth of the external-tooth gear has an approximately trapezoidal shape formed by reducing the addendum region of the external teeth, and combining two quarter-round shapes having centers defined by two points on the reference circle, so as to provide an increase tooth thickness, and an undercut shape in a dedendum region between the reference circle and a root circle of the external-tooth gear; and each of the internal teeth of the internal-tooth gear has an approximately trapezoidal shape free of interference with the addendum region of a corresponding one to the external teeth.

9. The bracket angle adjustment mechanism as defined in claim 8, wherein the undercut shape of the dedendum region is an arc shape continuously connected to the addendum region.

10. The bracket angle adjustment mechanism as defined in claim 8, which is used with a seat assembly having a seat back and a seat cushion to adjust a frontward/rearward angle of the seat back relative to the seat cushion, wherein one of the first and second brackets is fixed to the seat back, and the other bracket is fixed to the seat cushion.

* * * * *